(12) United States Patent
Pianka et al.

(10) Patent No.: US 11,777,674 B2
(45) Date of Patent: Oct. 3, 2023

(54) SPECTRUM-EFFICIENT UTILIZATION OF AN UPLINK CONTROL CHANNEL

(71) Applicant: CommScope Technologies LLC, Hickory, NC (US)

(72) Inventors: Boaz Pianka, Lexington, MA (US); Stuart D. Sandberg, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/156,323

(22) Filed: Jan. 22, 2021

(65) Prior Publication Data

US 2021/0266123 A1 Aug. 26, 2021

Related U.S. Application Data

(60) Provisional application No. 62/979,537, filed on Feb. 21, 2020.

(51) Int. Cl.
| | | |
|---|---|---|
| *H04W 72/00* | (2023.01) | |
| *H04L 5/00* | (2006.01) | |
| *H04W 72/1268* | (2023.01) | |
| *H04W 48/10* | (2009.01) | |
| *H04L 1/1607* | (2023.01) | |

(Continued)

(52) U.S. Cl.
CPC .......... *H04L 5/0037* (2013.01); *H04L 1/1671* (2013.01); *H04L 1/1854* (2013.01); *H04W 48/10* (2013.01); *H04W 72/1268* (2013.01); *H04W 72/20* (2023.01)

(58) Field of Classification Search
CPC ..... H04L 5/0037; H04L 1/1671; H04L 5/001; H04L 5/0016; H04L 5/0053; H04L 5/0087; H04L 5/0026; H04L 5/0048; H04L 1/1854; H04W 48/10; H04W 72/1268; H04W 72/0413; H04W 72/0406
See application file for complete search history.

(56) References Cited

U.S. PATENT DOCUMENTS 11,509,372 B2 * 11/2022 Liu .................. H04W 72/0446
2010/0002655 A1 1/2010 Ofuji et al.
(Continued)

FOREIGN PATENT DOCUMENTS

EP 2768265 A1 8/2014

OTHER PUBLICATIONS

CATT, "Further discussion on PUCCH resource allocation", 3GPP TSG RAN WG1 Meeting AH_#NR3, R1-1715823, Sep. 2017, CATT, Nagoya, Japan.

(Continued)

*Primary Examiner* — Brandon M Renner
(74) *Attorney, Agent, or Firm* — Fogg & Powers LLC

(57) ABSTRACT

A communication system for statically allocating physical uplink control channel (PUCCH) resources on a PUCCH. The communication system includes a base station configured to exchange radio frequency (RF) signals with a plurality of user equipment terminals (UEs). The base station is also configured to identify two PUCCH resources, each sharing the same orthogonal code sequence and located in different resource block of adjacent slots of a subframe. The base station is also configured to statically allocate the two PUCCH resources to two of the UEs, where both UEs are legacy UEs or Category-M1 (Cat-M1) UEs.

44 Claims, 8 Drawing Sheets

(51) Int. Cl.
  *H04L 1/1829* (2023.01)
  *H04W 72/20* (2023.01)

(56) References Cited

U.S. PATENT DOCUMENTS

| | | | |
|---|---|---|---|
| 2011/0250913 | A1 | 10/2011 | Vajapeyam et al. |
| 2015/0092702 | A1* | 4/2015 | Chen ................... H04L 5/0053 370/329 |
| 2015/0249980 | A1 | 9/2015 | You et al. |
| 2015/0358826 | A1 | 12/2015 | Wei et al. |
| 2016/0037550 | A1* | 2/2016 | Barabell ........... H04W 72/1263 455/450 |
| 2016/0072614 | A1* | 3/2016 | Blankenship ......... H04L 5/0044 370/329 |
| 2016/0192349 | A1* | 6/2016 | Wei ..................... H04M 1/725 370/329 |
| 2019/0223160 | A1 | 7/2019 | He et al. |
| 2019/0288982 | A1* | 9/2019 | Li ....................... H04L 61/2557 |
| 2019/0297618 | A1* | 9/2019 | Yang ................. H04W 72/0453 |
| 2019/0319766 | A1* | 10/2019 | Baldemair ............ H04L 5/1469 |
| 2020/0267718 | A1* | 8/2020 | Park .......................... H04L 1/06 |
| 2020/0350970 | A1* | 11/2020 | Liu ..................... H04L 27/2613 |
| 2020/0383137 | A1* | 12/2020 | Song ..................... H04W 48/12 |
| 2021/0204097 | A1* | 7/2021 | Takeda ................ H04W 72/042 |
| 2021/0250943 | A1* | 8/2021 | Rico Alvarino ..... H04B 7/0404 |
| 2021/0329611 | A1* | 10/2021 | Karjalainen ......... H04B 7/0695 |
| 2021/0368495 | A1* | 11/2021 | Matsumura ............ H04B 1/713 |

OTHER PUBLICATIONS

Ericsson, "PUCCH definition for MTC", 3GPP TSG RAN WG1 Meeting #83, R1-156415, Nov. 2015, pp. 1 through 7, Ericsson.

Huawei et al., "Remaining details of PUCCH configuration", 3GPP TSG RAN WG1 Meeting #82, R1-154605, Aug. 2015, pp. 1 through 5, Huawei, Hi Silicon, Beijing, China.

International Searching Authority, "International Search Report and Written Opinion from PCT Application No. PCT/US2021/014750", from Foreign Counterpart to U.S. Appl. No. 17/156,323, dated May 6, 2021, pp. 1 through 13, Published: WO.

European Patent Office, "Extended European Search Report", from EP Application No. 23165340.3, from Foreign Counterpart to U.S. Appl. No. 17/156,323, dated Jul. 24, 2023, pp. 1 through 10, Published: EP.

\* cited by examiner

```
                                  500
                                   ↙
┌─────────────────────────────────────────────────────────────────┐
│ RECEIVE INFORMATION SEPARATELY INDICATING A TYPE OF EACH OF A   │
│ PLURALITY UES CONNECTED TO A CELL IMPLEMENTED BY A BASE STATION │
│                              502                                │
└─────────────────────────────────────────────────────────────────┘
                                   ↓
┌─────────────────────────────────────────────────────────────────┐
│ BROADCAST A SYSTEM INFORMATION BLOCK (SIB) TO THE PLURALITY OF  │
│ UES CONNECTED TO THE CELL, WHERE THE SIB INDICATES A CONTIGUOUS │
│ REGION OF PUCCH RESOURCES ON AN UPLINK CONTROL CHANNEL          │
│ RESERVED FOR HARQ MESSAGES                                      │
│                              504                                │
└─────────────────────────────────────────────────────────────────┘
                                   ↓
┌─────────────────────────────────────────────────────────────────┐
│ SEND, TO EACH OF AT LEAST ONE OF THE PLURALITY OF UES, A        │
│ RESPECTIVE PDSCH ALLOCATION IN A DOWNLINK SUBFRAME, WHERE THE   │
│ POSITION OF AT LEAST ONE CHANNEL CONTROL ELEMENT (CCE)          │
│ CARRYING THE PDSCH ALLOCATION FOR A PARTICULAR UE IN THE        │
│ DOWNLINK SUBFRAME INDICATES AN INDEX OF A DYNAMICALLY-ALLOCATED │
│ PUCCH RESOURCE IN THE CONTIGUOUS REGION OF A SUBSEQUENT UPLINK  │
│ SUBFRAME                                                        │
│                              506                                │
└─────────────────────────────────────────────────────────────────┘
                                   ↓
┌─────────────────────────────────────────────────────────────────┐
│ AT EACH OF THE AT LEAST ONE UE, DETERMINE A RESPECTIVE          │
│ DYNAMICALLY-ALLOCATED PUCCH RESOURCE WITHIN THE CONTIGUOUS      │
│ REGION BASED ON THE POSITION OF THE RESPECTIVE AT LEAST ONE CCE │
│ CARRYING THE PDSCH ALLOCATION FOR THE RESPECTIVE UE             │
│                              508                                │
└─────────────────────────────────────────────────────────────────┘
                                   ↓
┌─────────────────────────────────────────────────────────────────┐
│ FOR AT LEAST ONE OF THE DYNAMICALLY-ALLOCATED PUCCH RESOURCES,  │
│ THE BASE STATION ALLOCATES A CORRESPONDING PAIRED PUCCH         │
│ RESOURCE, IF ANY, TO ANOTHER UE OF THE SAME TYPE AS THE UE THAT │
│ WAS ALLOCATED THE RESPECTIVE DYNAMICALLY-ALLOCATED PUCCH        │
│ RESOURCE                                                        │
│                              510                                │
└─────────────────────────────────────────────────────────────────┘
```

*FIG. 5*

SPECTRUM-EFFICIENT UTILIZATION OF AN UPLINK CONTROL CHANNEL

CROSS-REFERENCE TO RELATED APPLICATIONS

This application claims the benefit of U.S. Provisional Patent Application Ser. No. 62/979,537 filed on Feb. 21, 2020, entitled "SPECTRUM-EFFICIENT UTILIZATION OF AN UPLINK CONTROL CHANNEL", the entirety of which is incorporated herein by reference.

BACKGROUND

User equipment terminals (UEs) use uplink control channels, such as a Physical Uplink Control Channel (PUCCH), to transmit control information to a base station. It may be beneficial to efficiently utilize uplink control channel resources.

SUMMARY

A communication system for statically allocating physical uplink control channel (PUCCH) resources on a PUCCH. The communication system includes a base station configured to exchange radio frequency (RF) signals with a plurality of user equipment terminals (UEs). The base station is also configured to identify two PUCCH resources, each sharing the same orthogonal code sequence and located in different resource block of adjacent slots of a subframe. The base station is also configured to statically allocate the two PUCCH resources to two of the UEs, where both UEs are legacy UEs or Category-M1 (Cat-M1) UEs.

A method for statically allocating physical uplink control channel (PUCCH) resources on a PUCCH is performed by a base station. The method includes exchanging radio frequency (RF) signals with a plurality of user equipment terminals (UEs). The method also includes determining whether or not each of the plurality of UEs, connected to a cell implemented by the base station, is configured to switch frequencies from a first slot in a subframe to a second slot in the subframe. The method also includes statically allocating PUCCH resources, from predefined sets of PUCCH resources, for each of the plurality of UEs based on whether or not the respective UE is configured to switch frequencies from a first slot in a subframe to a second slot in the subframe.

A communication system, for dynamically allocating physical uplink control channel (PUCCH) resources on a PUCCH, includes a base station configured to send, to each of at least one of a plurality of user equipment terminals (UEs), a respective downlink shared channel allocation in a downlink subframe, where the position of at least one channel control element (CCE) carrying the downlink shared channel allocation for a particular UE in the downlink subframe indicates an index of a dynamically-allocated PUCCH resource in a hybrid automatic repeat request (HARQ) region of a subsequent uplink subframe. The plurality of UEs are each configured to exchange radio frequency (RF) signals with a plurality of UEs, each UE being a legacy UE or Category-M1 (Cat-M1) UE. Each of the at least one UE is configured to determine a respective dynamically-allocated PUCCH resource in the HARQ region of PUCCH resources based on the position of the respective at least one CCE carrying the downlink shared channel allocation for the respective UE. The base station is further configured to, for at least one of the dynamically- allocated PUCCH resources, allocate a corresponding paired PUCCH resource to another UE of the same type as the UE that was allocated the respective dynamically-allocated PUCCH resource.

A method for dynamically allocating physical uplink control channel (PUCCH) resources on a PUCCH. The method includes sending, from a base station to each of at least one of a plurality of user equipment terminals (UEs), a respective downlink shared channel allocation in a downlink subframe, where the position of at least one channel control element (CCE) carrying the downlink shared channel allocation for a particular UE in the downlink subframe indicates an index of a dynamically-allocated PUCCH resource in a hybrid automatic repeat request (HARQ) region of a subsequent uplink subframe. The method also includes determining, at each of the at least one UE, a respective dynamically-allocated PUCCH resource in the HARQ region of PUCCH resources based on the position of the respective at least one CCE carrying the downlink shared channel allocation for the respective UE. The method also includes allocating, by the base station and for at least one of the dynamically-allocated PUCCH resources, a corresponding paired PUCCH resource to another UE of the same type as the UE that was allocated the respective dynamically-allocated PUCCH resource.

DRAWINGS

Understanding that the drawings depict only exemplary configurations and are not therefore to be considered limiting in scope, the exemplary configurations will be described with additional specificity and detail through the use of the accompanying drawings, in which:

FIG. 5 is a flow diagram illustrating a method for statically allocating resources on an uplink control channel;

In accordance with common practice, the various described features are not drawn to scale but are drawn to emphasize specific features relevant to the exemplary configurations.

DETAILED DESCRIPTION

Long-Term Evolution (LTE) is a fourth generation (4G) cellular communication system standardized by the Third Generation Partnership Project (3GPP) organization. Each release of the LTE standard introduces more capabilities and features to support new use cases. Release 13 of the LTE standard includes support for evolved Machine-Type Communication (eMTC) devices, which are typically simpler, more cost-effective, and energy-efficient User Equipment (UE) devices than smartphones. These devices are referred to as Category-M1, or Cat-M1 UEs. In Release 14, further refinements were introduced, as well as support for intermediate-complexity Cat-M2 UE devices.

Although the intention was that existing LTE networks could support both legacy and Cat-M1 UEs simultaneously with minimal software changes, the different requirements and constraints of the new (Cat-M1) devices ended up changing many of the operating protocols and parameters used to communicate with these devices and legacy UEs. These changes sometime cause design conflicts.

One example of such conflict is the design of the Physical Uplink Control Channel (PUCCH) used to send information such as transmission acknowledgements, scheduling requests (SRs), and channel state information (CSI) updates from the UE to the base station its connected to. In order to avoid these design conflicts, and to efficiently utilize the PUCCH, the present systems and methods may allocate PUCCH resources in pairs, both going to legacy UEs or both going to Cat-M1 UEs, as described herein.

Example 4G System

Figure 1A:
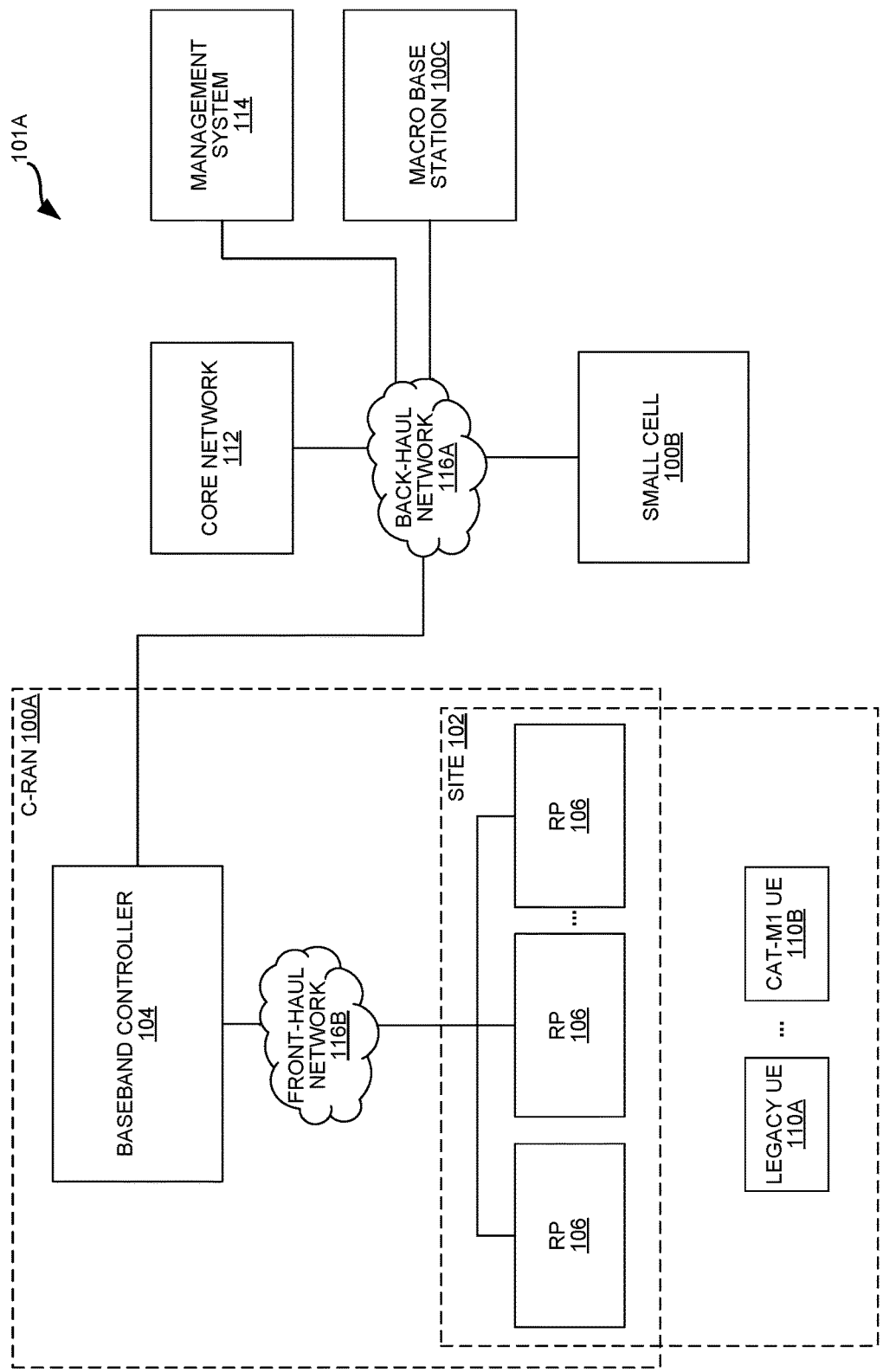
FIG. 1A is a block diagram illustrating a communication system that efficiently utilizes spectrum in an uplink control channel (e.g., the PUCCH)

FIG. 1A is a block diagram illustrating a communication system 101A that efficiently utilizes spectrum in an uplink control channel (e.g., the PUCCH). The system includes 3GPP Fourth Generation (4G) components. Optionally, the system 101A may also include 3GPP Fifth Generation (5G) components. The term base station 100 herein refers to any electronic device configured to receive and transmit RF signals in order to provide wireless service to user equipment (UEs) 110. Typically, base stations 100 are in a fixed location, however other configurations are possible. Without limitation, types of base stations include a cloud radio access network (C-RAN) 100A, a small cell 100B, a macro base station 100C, etc. Small cells 100B are generally lower-power, shorter-range, and can serve fewer max concurrent users than macro base stations 100C. For example, small cell(s) 100B may be used to fill in coverage gaps in macro base station 100C coverage, e.g., indoors, in urban environments, etc. In some cases, a C-RAN 100A may be considered a type of small cell 100B (and therefore, a type of base station 100).

In LTE, a base station 100 may be referred to as an "eNodeB" or "eNB", although the present systems and methods can alternatively or additionally be used with systems implementing 3G and/or 5G air interfaces. It is understood that the system 101A can include any type and number of base stations 100.

In the exemplary configuration shown in FIG. 1A, the C-RAN 100A utilizes a point-to-multipoint distributed base station architecture that employs at least one (and optionally multiple) baseband unit 104 and multiple radio points (RPs) 106A-N that serve at least one cell. The C-RAN 100A may also be referred to herein as a "C-RAN system," an "eNodeB," and/or a "base station." The baseband unit 104 is also referred to herein as a "baseband controller" 104, just a "controller" 104, or "CU" 104. Each RP 106 may include or be coupled to at least one antennas via which downlink RF signals are radiated to UEs 110 and via which uplink RF signals transmitted by UEs 110 are received. Furthermore, where an action is described as being performed by a C-RAN 100A, it may be performed in the baseband controller 104 and/or at least one RP 106.

The RPs 106 and UEs 110 connected to (e.g., provided wireless service by) the C-RAN 100A may be located at a site 102. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 102 may be at least partially indoors, but other alternatives are possible.

It should be noted that the baseband controller 104 may or may not be located at the site 102 (with the RPs 106). For example, the baseband controller 104 may be physically located remotely from the RPs 106 (and the site 102) in a centralized bank of baseband controllers 104. Additionally, the RPs 106 are preferably physically separated from each other within the site 102, although they are each communicatively coupled to the baseband controller 104.

Each UE 110 may be a computing device with at least one processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., 1-1,000) may be present at the site 102. Additionally, the UEs 110 may be legacy UEs 110A or Cat-M1 UEs 110B. As used herein, the term "legacy UE" refers to a UE 110 that is not a Cat-M1 UE 110B. Legacy UEs 110A may have capabilities that Cat-M1 UEs 110B do not, as described below.

The C-RAN 100A may be coupled to the core network 112 of each wireless network operator over an appropriate back-haul network 116A. For example, the Internet (or any other ETHERNET network) may be used for back-haul between the system 101A and each core network 112. However, it is to be understood that the back-haul network 116A can be implemented in other ways.

In some configurations, the C-RAN 100A may be implemented as a Long Term Evolution (LTE) radio access network providing wireless service using a 3GPP LTE air interface. However, it should be noted that the present systems and methods may be used with other wireless protocols, e.g., 2G, 3G, 5G. LTE is a 4G standard defined by 3GPP standards organization. In the LTE configuration, the baseband controller 104 and RPs 106 together (C-RAN 100A) may be used to implement an LTE Evolved Node B (also referred to here as an "eNodeB" or "eNB"). An eNodeB may be used to provide UEs 110 with mobile access to the wireless network operator's core network 112 to enable UE 110 to wirelessly communicate data and voice.

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNodeB gateway (HeNodeB GW) (not shown) and a Security Gateway (SeGW) (not shown).

Moreover, in an exemplary LTE configuration, the baseband controller 104 may communicate with the MME and SGW in the EPC core network 112 using the LTE S1 interface and communicates with eNodeBs using the LTE X2 interface. For example, the baseband controller 104 can communicate with a macro base station 100C via the LTE X2 interface.

The baseband controller 104 and radio points 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In some configurations, the front-haul network 116B that communicatively couples each baseband controller 104 to the one or more RPs 106 is implemented using a standard ETHERNET network. However, it is to be understood that the front-haul network 116B between the baseband controller 104 and RPs 106 can be implemented in other ways. The front-haul network 116B may be implemented with one or more switches, routers, and/or other networking devices.

Data can be front-hauled between the baseband controller 104 and RPs 106 in any suitable way (for example, using front-haul interfaces and techniques specified in the Common Public Radio Interface (CPRI) and/or Open Base Station Architecture Initiative (OBSAI) family of specifications).

The Third Generation Partnership Project (3GPP) has adopted a layered model for the LTE radio access interface. Generally, the baseband controller 104 and/or RPs 106 perform analog radio frequency (RF) functions for the air interface as well as digital Layer-1 (L1), Layer-2 (L2), and/or Layer-3 (L3), of the 3GPP-defined LTE radio access interface protocol, functions for the air interface. In some configurations, the Layer-1 processing for the air interface may be split between the baseband controller 104 and the RPs 106, e.g., with L2-L3 functions for the air interface being performed at the baseband controller 104.

A management system 114 may be communicatively coupled to the baseband controller 104 and RPs 106, for example, via the back-haul network 116A and the front-haul network 116B (in the case of the RPs 106). In some configurations, the management system 114 is a home eNodeB management system (HeMS) and/or a device management system (DMS). The management system 114 may send and receive management communications to and from the baseband controller 104, which in turn forwards relevant management communications to and from the RPs 106. Additionally, the management system 114 may assist in managing and/or configuring the base stations 100. For example, an operator may provide user input to the management system 114 to reconfigure one or more PCIs in a system 101A.

Example 5G System

Figure 1B:
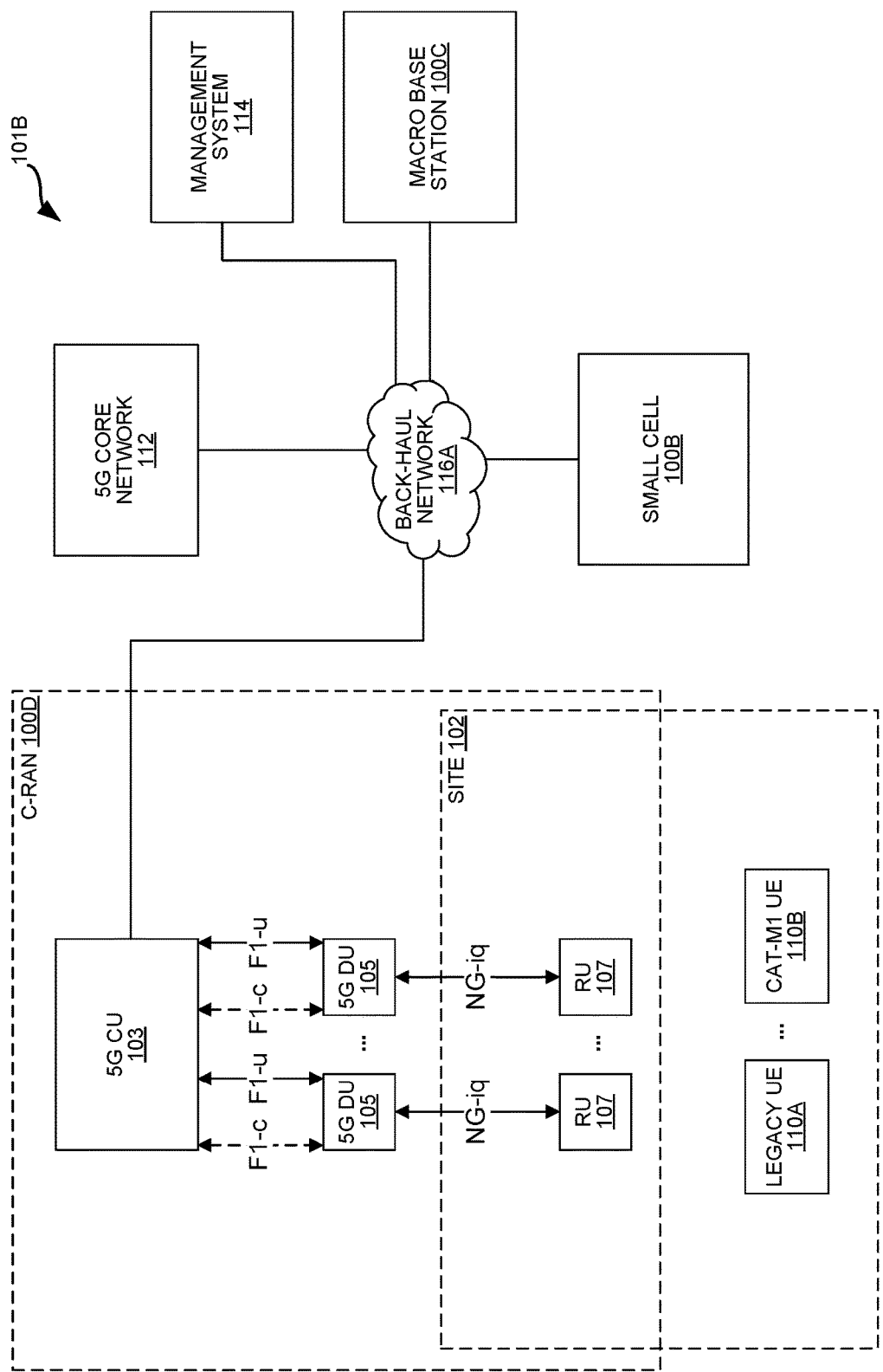
FIG. 1B is a block diagram illustrating another communication system that efficiently utilizes spectrum in an uplink control channel (e.g., the PUCCH)

FIG. 1B is a block diagram illustrating another communication system 101B that efficiently utilizes spectrum in an uplink control channel (e.g., the PUCCH). The system 101B includes 3GPP Fifth Generation (5G) components. Optionally, the system 101B may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the C-RAN 100D in FIG. 1B, interfaces denoted with "-c" or simply "c" (illustrated with dashed lines) provide control plane connectivity, while interfaces denoted with "-u" or simply "u" (illustrated with solid lines) provide user plane connectivity.

FIG. 1B illustrates a C-RAN 100D implementing an example of a 5G Next Generation NodeB (gNB). The architecture of a Next Generation NodeB (gNB) is partitioned into a 5G Central Unit (CU) 103, one or more 5G Distributed Unit (DU) 105 and one or more 5G Remote Units (RU) 107. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105 over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 107.

In FIG. 1B, the C-RAN 100D implementing the example Next Generation NodeB (gNB) includes a single CU 103, which handles control plane functions and user plane functions. The 5G CU 103 (in the C-RAN 100D) may communicate with at least one wireless service provider's Next Generation Cores (NGC) 112, e.g., using 5G NGc and 5G NGu interfaces. In some 5G configurations (not shown), a 5G CU is split between a CU-C that handles control plane functions and a CU-U that handles user plane functions.

In some 5G configurations, the RUs 107 may communicate baseband signal data to the DUs 105 on an NG-iq interface. In some 5G configurations, the RUs 107 may implement at least some of the L1 and/or L2 processing. In some configurations, the RUs 107 may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Where functionality of a baseband controller 104 is discussed herein, it may be equally applicable to a 5G CU 103 or 5G DU 105 in 5G configurations. Similarly, where functionality of an RP 106 is discussed herein, it may be equally applicable to an RU 107 in 5G configurations. Therefore, where a C-RAN 100 is described herein, it may include 4G components (as in FIG. 1A) and/or 5G components (as in FIG. 1B).

PUCCH Problem with Cat-M1 UEs

Figure 2A:
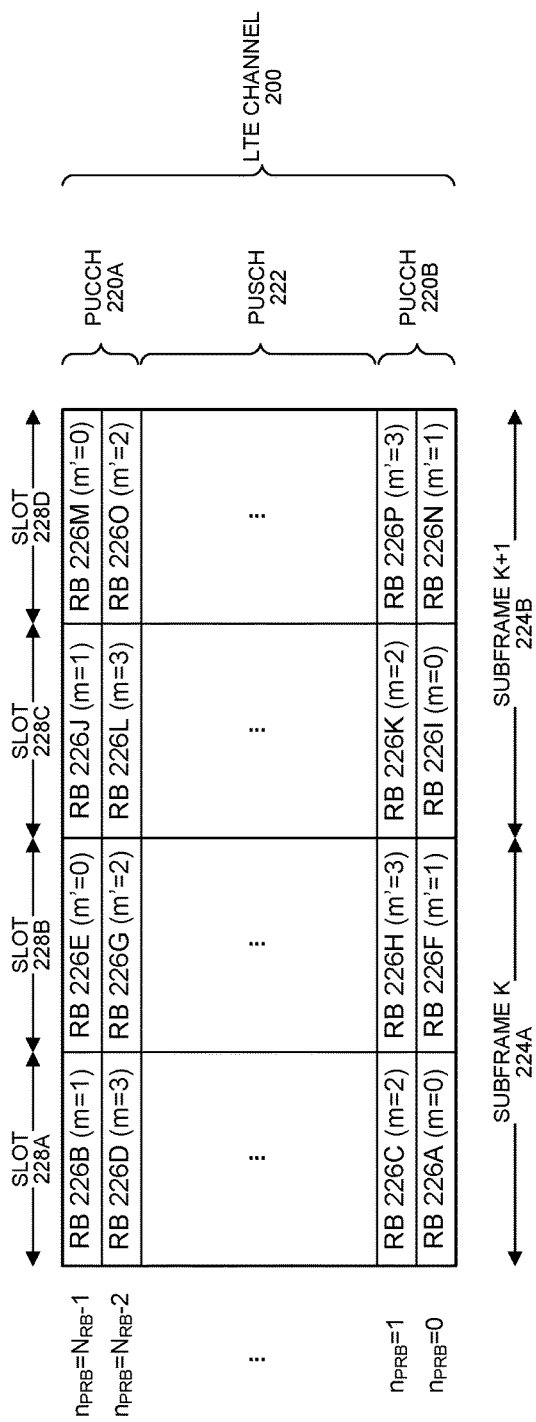
FIG. 2A is a block diagram illustrating how a legacy UE might utilize the spectrum of an example LTE channel.
Figure 2B:
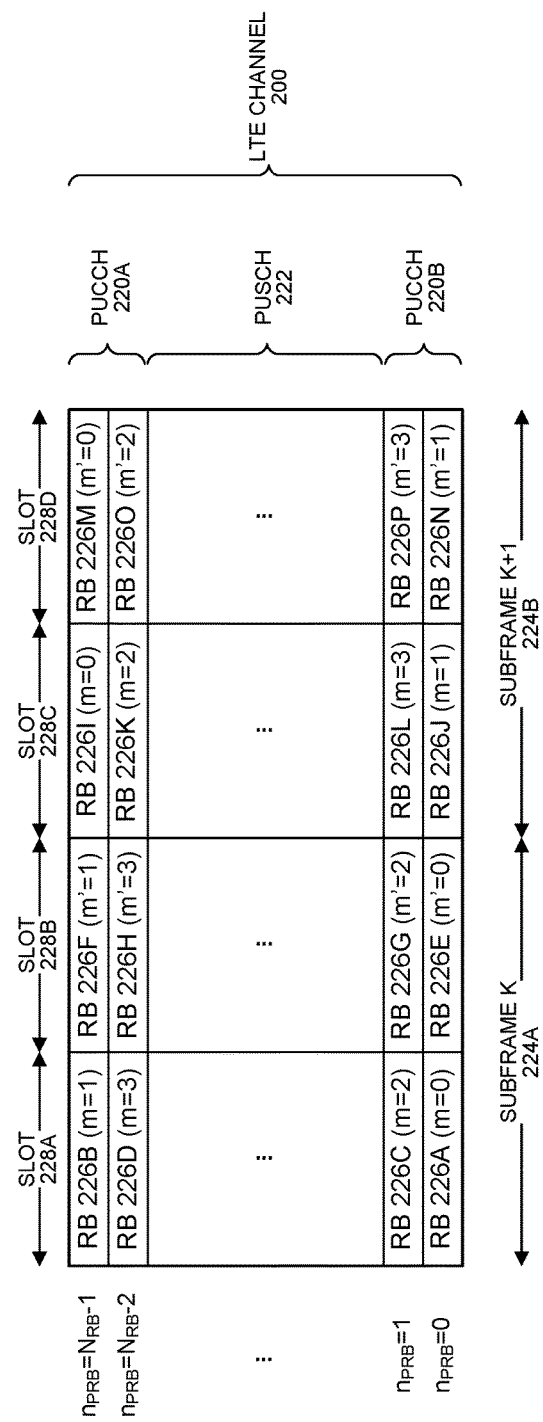
FIG. 2B is a block diagram illustrating how a Cat-M1 UE might utilize the spectrum of an example LTE channel.

FIGS. 2A-B are block diagrams illustrating utilization of an LTE channel 200. Specifically, the Y axis in both FIGS. 2A-B represents frequency within the LTE channel 200, while the X axis in both FIGS. 2A-B represents time. It is desirable to utilize the LTE channel 200 bandwidth efficiently to transport user payload data (sent on PUSCH 222 in the middle of the LTE channel 200). Control messages are sent on a fraction of the spectrum at the edges of the LTE channel 200, referred to as the PUCCH 220A-B. Although necessary for operation, control messages are considered as overhead that needs to be minimized. To that end, the LTE channel 200 bandwidth is divided into smaller chunks called resource blocks (RBs) 226A-P, and as few of them as possible are used for PUCCH 220. The RBs 226 are transmitted on physical resource blocks (PRBs) numbered from 0 to ($N_{RB}$-1), where $N_{RB}$ is the number of RBs 226 in the LTE channel 200. In some configurations, a PRB is 12 subcarriers wide, which span an RB 226 that is 180 KHz wide. LTE channels 200 of 5, 10, or 20 MHz may include 25, 50, or 100 PRBs, respectively.

Control RBs 226 (in the PUCCH 220) are mapped from the edges of the LTE channel 200 bandwidth toward the center, with the lower-indexed m's dedicated to Format-2 messages, and higher-indexed m's dedicated to Format-1. Note that each control message spans a single RB 226 over a single uplink (UL) subframe 224. Each half-subframe 224 is called a slot 228A-D.

FIG. 2A is a block diagram illustrating how a legacy UE 110A might utilize the spectrum of an example LTE channel 200. Specifically, FIG. 2A depicts the mapping of PUCCH RBs 226 to time and frequency resources of an LTE (uplink) channel 200 for legacy UEs 110A. Legacy UEs 110A are able to observe and transmit anywhere within an LTE channel bandwidth (without re-tuning their channel frequency). Additionally, the design of the PUCCH 220 exploits this fact to switch the frequency used between opposing ends of the LTE channel 200 bandwidth in the middle of each message (subframe 224), giving rise to spectral diversity and increased reliability.

In other words, legacy UEs 110A are configured to switch frequencies from the first slot 228A in a subframe 224A to the second slot 228B in the same subframe 224A. The RB 226 used by a legacy UE 110A in the first slot 228 of a subframe 224 is denoted as m, while the RB 226 used by the same legacy UE 110A in the second slot 228 of the same subframe 224 is denoted as m'. For example, if a particular legacy UE 110A transmits an uplink control message on RB 226B (m=1) at the top edge of the LTE channel 200 during a first slot 228A of a subframe 224A, the particular legacy UE 110A will finish transmitting the uplink control message on RB 226F (m'=1) at the bottom edge of the LTE channel 200 during the second slot 228B of the same subframe 224A.

FIG. 2B is a block diagram illustrating how a Cat-M1 UE 110B might utilize the spectrum of an example LTE channel 200. Specifically, FIG. 2B depicts the mapping of PUCCH RBs 226 to time and frequency resources of an LTE (uplink) channel 200 for Cat-M1 UEs 110B. In contrast to legacy UEs 110A, Cat-M1 UEs 110B are only capable of observing or transmitting on a narrower region of the LTE channel bandwidth (a narrowband channel), in some configurations, and must tune to a different channel frequency entirely to switch operation between opposing ends of the LTE channel 200. This makes it impractical to switch transmission in the middle of a message (subframe 224). Therefore, in some configurations, Cat-M1 UEs 110B only switch between messages (subframes 224) to achieve spectral diversity gain.

In other words, Cat-M1 UEs 110B may transmit on the same resource block of the LTE channel bandwidth for the entire subframe 224, while legacy UEs 110A may transmit on different resource blocks in different slots 228 in a subframe 224. The RB 226 used by a Cat-M1 UE 110B in the first slot 228 of a subframe 224 is denoted as m, while the RB 226 used by the same Cat-M1 UE 110B in the second slot 228 of the same subframe 224 is denoted as m'. For example, if a particular Cat-M1 UE 110B transmits an uplink control message on RB 226B (m=1) at the top edge of the LTE channel 200 during a first slot 228A of a subframe 224A, the particular Cat-M1 UE 110B will finish transmitting the uplink control message on an RB 226F (m'=1), also at the top edge of the LTE channel 200, during the second slot 228B of the same subframe 224A.

Moreover, multiple Uplink Control Information (UCI) messages can be simultaneously multiplexed onto a single RB 226 (in the PUCCH 220) at the same time using a Code Division Multiple Access (CDMA) scheme. Using this scheme, each user/UE 110 uses a unique code sequence (PUCCH resource) assigned from a set of N orthogonal sequences to scramble (or spread) its UCI message on the PUCCH. The unique code sequence (also referred to as a "PUCCH resource" or just "resource"), within a set of code sequences, is assigned to the user/UE 110 and identified by a PUCCH resource index. In other words, a PUCCH resource is a key or code that allows the UE 110 to transmit in the same RB 226 with other UEs 110 that are using orthogonal PUCCH resources. For Format-1, there's typically 36 resources per resource block 226. For Format-2, there's typically 12 PUCCH resources per resource block 226. However, other configurations are possible. As explained in more detail below, each PUCCH resource index is associated with a PUCCH resource in both slots 228 of a subframe 224, where the two PUCCH resources are considered "paired".

Both types of UEs 110 (legacy and Cat-M1) send UCI using two main PUCCH formats. Format-1 messages support transmission acknowledgements and scheduling requests which require a small number of bits, hence more users can be multiplexed on a single RB 226, e.g., there are typically up to N1=36 orthogonal sequences (PUCCH resources in an RB 226 used for Format-1 messages. Format-2 messages provide channel state information combined with acknowledgements and require more bits. Hence, only up to 12 users can be multiplexed on a single RB 226. In other words, there are typically up to N1=12 orthogonal sequences (PUCCH resources in an RB 226 used for Format-2 messages. In most cases, Format-1 and Format-2 uplink messages must utilize separate sets of RBs 226.

The basic modulation, coding and multiple access scheme of PUCCH 220 for Cat-M1 UEs 110B has remained unchanged from the modulation, coding and multiple access scheme PUCCH 220 for legacy UEs 110A. As noted above, the RB index is denoted by m in the first slot 228 (or m' in the second slot) in FIGS. 2A-B. While the RBs 226 are mapped differently in the time-domain for legacy UEs 110A (switched to different frequency at different times) than for Cat-M1 UEs 110B, the pattern of orthogonal codes within an RB 226 remains the same regardless of whether the RB 226 is located at the top edge or the bottom edge of the LTE channel 200.

As described above, legacy UEs 110A switch between RBs 226 (m→m') on opposing edges of the LTE channel 200 in the middle of the subframe 224 while maintaining the same orthogonal code sequence. However Cat-M1 UEs 110B use RBs 226 (m→m') at the same frequency and PUCCH resource index over a complete subframe 224A, and only switches to an RBs 226 at the opposing edge of the PUCCH 220 in the next subframe 224B.

For example, a legacy UE 110A may transmit in an m=0 RB 226A in a first slot 228A and an m'=0 RB 226E (at the opposite edge of the LTE channel 200) in a second slot 228B of the same subframe 224, where transmissions in both slots 228 use the same PUCCH resource (n). In contrast, a Cat-M1 UE 110B may transmit in an m=0 RB 226A in a first slot 228A and the same m'=0 RB 226E (at the same frequency within the LTE channel 200) in a second slot 228B of the same subframe 224, where transmissions in both slots 228 use the same PUCCH resource (n). In other words, the legacy UE 110A transmits on an RB 226 near (or at) the opposite edge of the LTE channel 200 in a second slot 228B following transmission on an RB 226 in a first slot 228A, while a Cat-M1 UE 110B remains on RBs 226 at the same edge of the LTE channel 200 for the duration of the subframe 224.

This difference (in how legacy UEs 110A and Cat-M1 UEs 110B utilize the PUCCH 220) can result in collision situations. For example, when a legacy UE 110A is assigned a PUCCH resource index or code sequence (n) on an RB 226 with a first index, while a Cat-M1 UE 110B is assigned the same orthogonal code sequence (n) on an RB 226 with a second (different) index on the same subframe 224. On the 2nd half of the subframe 224 (second slot 228) the legacy UE 110A would switch to RB 226 (m') at the opposite edge of the LTE channel 200 and would conflict/collide with the Cat-M1 UE 110B using an RB 226 at the same edge of the LTE channel 200 and the same orthogonal code sequence during that half-subframe (slot 228). A conflict or collision occurs when two different UEs 110 (of either type) transmit in the same RB 226 using the same orthogonal code sequence. Such collisions pertain to both Format-1 and Format-2 PUCCH 220 transmissions. Such collisions cause interference and should be avoided.

For example, if a legacy UE 110A transmitted on RB 226B (m=1), resource n in the first slot 228A of subframe K 224A, it would then transmit on RB 226F (m'=1), resource n in the second slot 228B of subframe K 224A. If a Cat-M1 UE 110B transmitted on RB 226A (m=0), resource n in the first slot 228A of subframe K 224A, it would also transmit on RB 226E (m'=0) at the same frequency and resource n in the second slot 228B of subframe K 224A. Since the legacy UE 110A and the Cat-M1 UE 110B would transmit on the same RB 226 (m'=1 for the legacy UE 110A and m'=0 for the Cat-M1 UE 110B), they would interfere with each other and risk neither transmission being successfully decoded at the receiving base station 100.

A PUCCH resource index is a based on a combination of the code sequence (n) and RB number (m): $n^{(2)}=m \cdot N_{seq}+n$, for Format-2 resources, where $N_{seq}=12$ is the sequence length; and $n^{(1)}=(m-N_{RB}^2) \cdot cN_{seq}+n$, for Format-1 resources, were c is 2 or 3, and $N_{RB}^2$ is the number of RBs 226 reserved for Format-2.

The implication is that in order to avoid such conflicts, legacy UEs 110A and Cat-M1 UEs 110B traditionally need to be allocated on different pools of RBs 226. Therefore one possible way of dealing with this type of conflict is to allocate more RBs 226 at the edge of the LTE channel 200 to PUCCH 220, e.g., allocate one or more of the resource blocks 226 only to legacy UEs 110A, one or more only to Cat-M1 UEs 110B. This additional allocation of RBs 226 to overhead control channel (PUCCH) messaging (instead of user payload (PUSCH) data) would degrade spectral efficiency.

Figure 3:
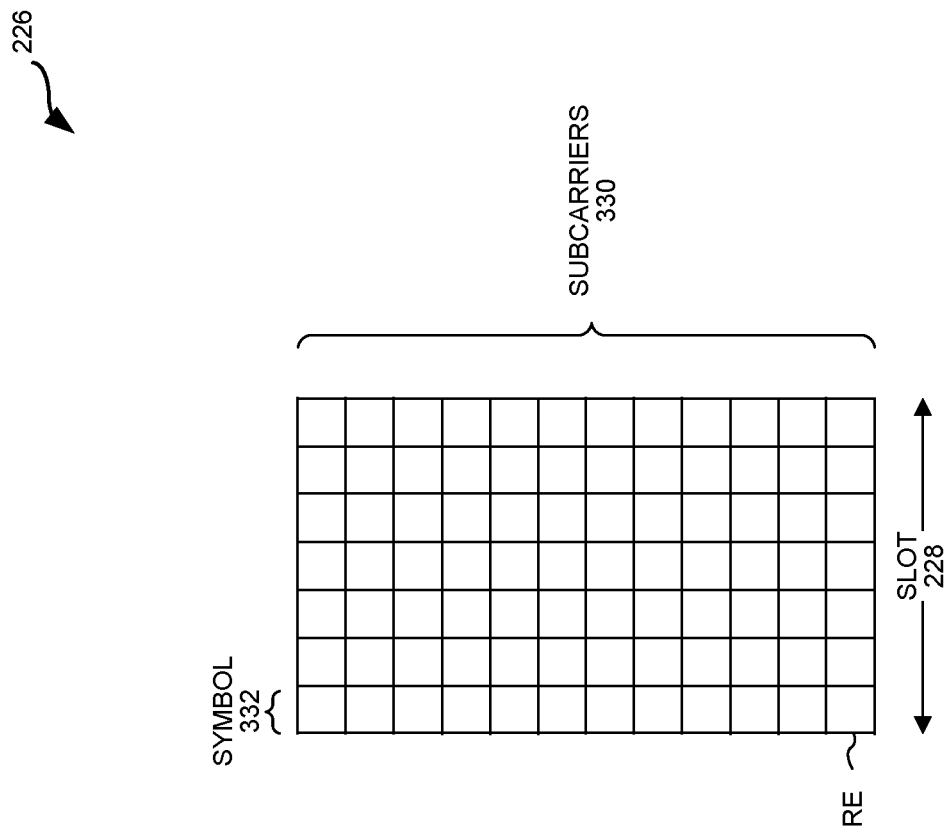
FIG. 3 is a block diagram illustrating an example resource block.

FIG. 3 is a block diagram illustrating an example resource block 226. Each row in FIG. 3 represents one subcarrier 330. There are 12 subcarriers shown in the example RB 226, however, other configurations are possible. Each column in FIG. 3 represents one symbol 332. There are 7 symbols transmitted in the example resource block 226, however, other configurations are possible. Each square (one symbol 332×one subcarrier 330) in FIG. 3 is a Resource Element (RE). For example, the example resource block 226 in FIG. 3 includes 84 REs, but other configurations are possible.

A channel control element (CCE), discussed below, is a unit of downlink control information (DCI) used to transmit to legacy UEs 110A on the PDCCH. Specifically, a CCE is a group of 36 REs in the first 1, 2, or 3 symbols 332 of a subframe 224, depending on the Control Format Indicator (CFI) for the subframe 224. In some configurations, a starting CCE may be used to schedule DL and may only be relevant to the dynamic Format-1 HARQ resources on the UL. In contrast to legacy UEs 110A, Cat-M1 UEs 110B receive DCI on extended CCEs (ECCEs) on an MTC physical downlink control channel (MPDCCH). However, the term CCE(s) is used herein to refer to CCE(s) (for legacy UEs 110A) or ECCE(s) (for Cat-M1 UEs 110B).

Allocating PUCCH Resources in Pairs

To minimize the number of RBs 226 allocated in the uplink to PUCCH 220, the present systems and methods assign PUCCH resources to users in the same RB 226 in a way that avoids these type of collisions. Using fewer RBs 226 for control information translates to higher system spectral efficiency and, therefore, higher user payload data rates (higher throughput) on the same LTE channel 200 bandwidth.

In order to achieve these benefits, a change to how PUCCH resources are mapped to the PUCCH RBs 226 is described herein. Specifically, the PUCCH resources are allocated in pairs, where both PUCCH resources in each pair are allocated to either legacy UEs 110A or Cat-M1 UEs 110B. Each pair of PUCCH resources consists of a code sequence (n) in two consecutive RBs 226 {m|m=k, k+1}. Such allocation prevents collisions between legacy UEs 110A and Cat-M1 UEs 110B (because it eliminates a situation where one PUCCH resource in a pair is allocated to a legacy UE 110A and the other PUCCH resource in the pair is allocated to a Cat-M1 UE 110B). However, both types of UEs 110 are subjects to additional constraints which require efficient utilization of the PUCCH resource pairs. A PUCCH resource pair can be denoted as:

$$S_P^1=\{(n_0,n_1)|n_1=n_0+cN_{seq}\}$$

where $n_0$ and $n_1$ are the PUCCH resource indices in the PUCCH resource pair c is 2 or 3 (depending on cyclic prefix length); and $N_{seq}=12$ is the number of orthogonal base-sequences in PUCCH.

Format-1 PUCCH resources are allocated in two different ways. Static allocation is used for scheduling requests, semi-persistent scheduling (SPS) acknowledgements, and carrier-aggregation (CA) channel selection. In static allocation, the network (e.g., a baseband controller 104) assigns a static PUCCH resource index to each UE 110 upon its initial connection to a cell. In contrast, for normal downlink (DL) transmission acknowledgements (HARQ), PUCCH resources are selected dynamically out of a region of consecutive Format-1 PUCCH resource indices depending on the DL control resource used to schedule the associated downlink transmission. The required size of this set and the index increment of its elements for each UE 110 type (legacy or Cat-M1) is determined by the total available downlink control resources and the minimum resources required for a DL control message, respectively.

According to the present systems and methods, Format-1 dynamic PUCCH resources are allocated to Cat-M1 UEs 110B as a linear series of PUCCH resource pairs, where one resource of the pair is used as the dynamic resource in an RB 226 ($n_0$), while the matching resource of the pair in RB 226 ($n_1$) is also allocated to a Cat-M1 UE 110B as Format-1 static PUCCH resource or a dynamic PUCCH resource. So, when a series of $n_0$s is allocated as dynamic HARQ resources to Cat-M1 UEs 110B, the paired 1ns are automatically reserved for Cat-M1 UEs 110B but will not be used for HARQ. The proposed utilization of those Ins is as static Format-1 resources for Cat-M1 UEs 110B. Similarly, when a series of $n_0$s are allocated as dynamic HARQ resources to Legacy UEs 110A, the paired Ins are precluded from being reserved for Cat-M1 UEs 110B.

The downlink control resource increment (aggregation level) can be 1, 2, 4, or 8. When the aggregation level is 1, 2, 4, or 8, then the base station 100 will use 1, 2, 4, or 8 consecutive channel control elements (CCEs), respectively, to send this information to the UE 110 about what the UE's 110 allocation for the Physical Downlink Shared Channel (PDSCH). Generally, a higher aggregation level will provide better reliability than a lower aggregation level, e.g., aggregation levels 2, 4, or 8 will provide better reliability than aggregation level 1.

When the minimum aggregation level for Cat-M1 UEs 110B is always greater than 1, there will be gaps between dynamic resources for Cat-M1 UEs 110B. These gap resources may also be used for static Format-1 allocations for either legacy UEs 110A or Cat-M1 UEs 110B, provided their paired resources are reserved for the same type of UE 110. Specifically, for one PUCCH resource in the gap, both it and its paired PUCCH resource in the other RB 226 must be for Cat-M1 UEs 110B or for legacy UEs 110A. It can be a dynamic PUCCH resource for a legacy UE 110A only in certain cases, depending on the minimum aggregation level for legacy UEs 110A. When the minimum aggregation level of both legacy and Cat-M1 control information is greater than 1, there will be gaps between dynamic resources of both, which allows interleaving of dynamic Cat-M1 and dynamic legacy resources by offsetting the start resource of the latter. In this case, further compacting of resources to fewer RBs 226 could be afforded.

Otherwise, when the minimum aggregation level for legacy UEs 110A is not greater than 1, their dynamic Format-1 allocations (which are beyond resource indices within RBs 226 shared with Cat-M1 UE 110B) are not required to be allocated in pairs. Additionally, while the range of dynamic resources need not include the paired resource in the other RB 226, those paired resources must be used for the same type of UEs 110 (legacy or Cat-M1), if used.

Without loss of generality, the present systems and methods start allocating Cat-M1 PUCCH resources at the first RB 226 available to Format-1 in each uplink (UL) subframe 224. The maximum number of dynamic Cat-M1 PUCCH resources per subframe 224 is limited to 16 (as determined by the available downlink control resources in a narrowband channel defined for this type of UE 110). The paired PUCCH resources in the next RB 226 are then allocated to static Cat-M1 UEs 110B for scheduling requests (SR) and semi-persistent scheduling (SPS) because they connect to the network in specific subframes subject to additional constraints described below. In most cases, after allocating the maximum number of static PUCCH resources for Cat-M1 UEs 110B in these paired PUCCH resources, there remain additional PUCCH resource pairs (pairs for which neither resource has been reserved for Cat-M1 UEs 110B) in each subframe 224 that are available for PUCCH resources that are statically allocated to legacy UEs 110A.

Format-2 PUCCH resources are only allocated in a static way. Without loss of generality, the present systems and methods start allocating PUCCH resources for Cat-M1 UEs 110B as they connect in a subframe 224 available for Cat-M1 UEs 110B using the first resource of the pair at (n0), then the second resource of the pair at (n1).

The total number of static Format-2 PUCCH resources ($N_{CSI}^{(UL,M1)}$) depends on the maximum number of Cat-M1 UEs 110B supported by the system 101A ($N_{UE}$), the configured CSI report periodicity ($T_{CSI}$), and the number $N_{CSI}$ of subframes (out of $T_{CSI}$) assigned for UL CSI transmission. Rounded to pairs, $$N_{CSI}^{(UL,M1)} = 2 \cdot \left\lceil \frac{N_{UE}}{2 \cdot N_{CSI}} \right\rceil.$$

The system 101A allocates Format-2 PUCCH resources to legacy UEs 110A as they connect starting at $N_{CSI}^{(UL,M1)}/2$ in each of the first two RBs 226. This results in efficient use of each RB 226 for CSI messages (in most cases utilizing all the resource indices), whereas otherwise at least 2 RBs 226 would need to be reserved for Format-2 PUCCH resources for Cat-M1 UEs 110B, which will could be sparsely utilized.

Other Subframe Considerations

Further constraints exist on the subframes 224 where PUCCH opportunities exist, which should also be resolved. Cat-M1 UEs 110B typically only support half-duplex FDD, which means that only 3 contiguous subframes 224 are available for uplink in each frame (e.g., a set of 10 subframes 224).

A Sounding Reference Signal (SRS) should be allocated in at least one of the subframes 224 in each frame with an SRS opportunity configured in the cell. Since the SRS is considered overhead, there is incentive to allocate the SRS for both legacy UEs 110A and Cat-M1 UEs 110B in the same subframe 224. SRS allocation is limited to specific subframe 224 patterns. The SRS configuration then constrains which of the uplink subframes 224 are Cat-M1 uplink subframes.

PUCCH CSI is incompatible with SRS. Hence, for half-duplex Cat-M1 UEs 110B, the available uplink subframes 224 further reduces to two per frame. This increases the number of required Format-2 PUCCH resources per uplink frame.

PUCCH SR resources for a UE 110 should not be allocated in the same subframe 224 where PUCCH CSI (particularly CQI) resources are scheduled for the same UE 110.

Both legacy UEs 110A and Cat-M1 UEs 110B are configured with Discontinuous Reception (DRX) cycles to conserve battery energy, where the UE 110 is only required to monitor the network (e.g., process and decode incoming RF signals) during short DRX ON periods in between long intervals of inactivity (during which the UE 110 is not required to process and decode incoming RF signals). It is desirable to align the SRS and static PUCCH SR and CSI opportunities with the UE's 110 DRX ON periods. In other words, the PUCCH resources allocated to a UE for transmitting SRS, CSI, and SRs should be located in the UE's DRX ON period.

Each UE 110 is also configured with a specific Measurement Gap (MG), which is a period of time where the UE 110 cannot receive or transmit on the cell it is connected to but must perform inter-cell or inter-RAT measurements requested by the network (e.g., system 101A). The Measurement Gap for each type of UE 110 must also be configured such that it does not align with the SRS and static PUCCH SR and CSI opportunities, and is contiguous with the DRX period of the UE 110. In other words, the PUCCH resources allocated to a UE for transmitting SRS, CSI, and SRs should not be located in the UE's Measurement Gap (MG).

Selection mechanisms are devised for legacy UEs 110A and Cat-M1 UEs 110B to select the configurations of SRS, PUCCH SR and CSI, DRX and MG according to the present systems and methods such that all the described constraints are met. These selection mechanisms may be executed either (1) when a UE 110 connects to the system 101A; or (2) offline to generate tables of configuration parameters that are exercised upon UE 110 connection.

Static Allocation of PUCCH Resource Pairs

Figure 4:
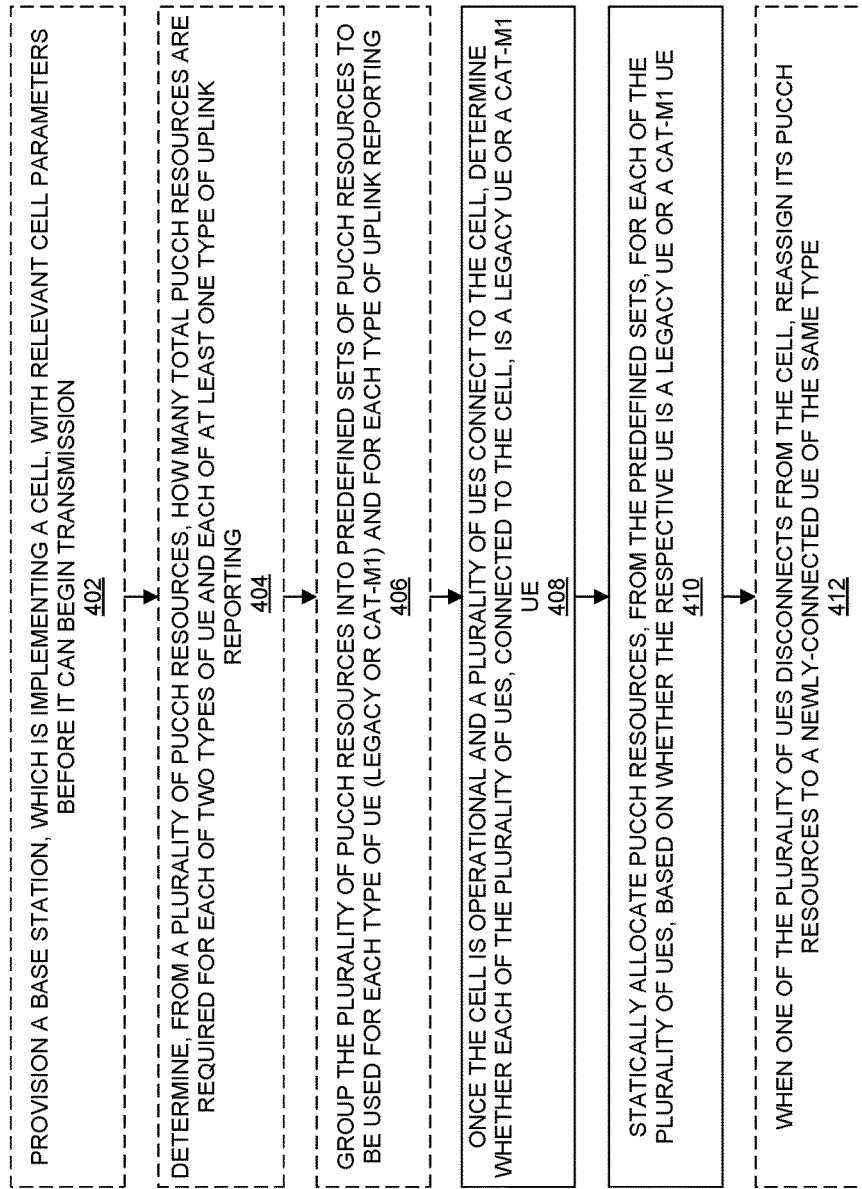
FIG. 4 is a flow diagram illustrating a method for statically allocating resources on an uplink control channel.

FIG. 4 is a flow diagram illustrating a method 400 for statically allocating resources on an uplink control channel, e.g., the PUCCH 220. The method 400 may be performed by a base station 100 in a wireless communication system 101A, e.g., implementing a 3GPP LTE air interface. For example, the method 400 may be performed in a small cell 100B, a macro base station 100C, or a baseband controller 104 in a C-RAN 100A. Whatever type of base station 100 is used, the method 400 may be performed by at least one processor executing instructions stored on at least one memory.

The base station 100 may provide wireless service (including allocating PUCCH resources) to both legacy UEs 110A and Cat-M1 UEs 110B. The method 400 may ensure that PUCCH resources assigned to legacy UEs 110A and Cat-M1 UEs 110B don't conflict with each other.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins at optional step 402 where the base station 100 (implementing a cell) is provisioned with relevant cell parameters before it can begin transmission. Optional step 402 includes a provisioning stage where relevant cell parameters are configured for the base station 100, such as: a max number of Legacy UEs 110A and Cat-M1 UE 110B connections to admit; SRS, SR, and CQI required reporting periods; the max number of UEs 110 serviced per subframe 224 for each type of UE 110, etc. In some configurations, these parameters are provisioned for the base station 100 by an operator and/or management system 114.

The method 400 proceeds at optional step 404 where the at least one processor (in the base station 100) then determines, from a plurality of PUCCH resources, how many total PUCCH resources are required for each of at least two types of UE 110 (legacy and Cat-M1) and each of at least one type of UL reporting (e.g., SRS, SR, and CQI).

The method 400 proceeds at optional step 406 where the at least one processor groups the plurality of PUCCH resources into predefined sets of PUCCH resources to be used during operation for each type of UE 110 (legacy or Cat-M1) and for each type of UL reporting (e.g., SRS, SR, CQI). These predefined sets must already obey the rules of allocation in pairs for collision avoidance, e.g., {0, 1, 4, 36, 37, 40} could be a set for all SR reports by Cat-M1 UEs 110B.

As described above, a PUCCH resource can be thought of as a code (from a set of orthogonal codes) that allows different UEs 110 to transmit on the same resource block (RB) 226 of the PUCCH without conflicting with each other. In some configurations, the following information is determinative of a PUCCH resource: (1) a specific subframe 224 (and a specific system frame number); (2) a PRB within the subframe 224; (3) cyclic shift; and (4) an optional orthogonal sequence for Format-1 (resource-index) for its scheduling requests (SR) and channel quality indications (CQI) on the PUCCH 220. By using orthogonal PUCCH resources, multiple Uplink Control Information (UCI) messages (from multiple UEs 110) can be simultaneously multiplexed onto a single RB 226 in the PUCCH 220 at the same time using a Code Division Multiple Access (CDMA) scheme. For Format-1 uplink messages, there's up to 36 PUCCH resources per resource block 226 (different capacities are possible using different cyclic-shift and delta-shift modes). For Format-2 uplink messages, there's up to 12 PUCCH resources per resource block 226. However, other configurations are possible.

The method 400 proceeds at step 408 where, once the cell is operational and a plurality of UEs 110 connect to the cell, the at least one processor determines whether each of the plurality of UEs 110 is a legacy UE 110A (that is configured to switch frequencies from the first slot 228 in a subframe 224 to the second slot 228 in the same subframe 224) or a Cat-M1 UE 110B (that is not configured to switch frequencies from the first slot 228 in a subframe 224 to the second slot 228 in the same subframe 224).

In some configurations, the at least one processor determines the UE 110 type based on the RACH resources used by the UE 110 to connect to a cell implemented by the base station 100. Cat-M1 UEs 110 may connect to the cell using dedicated Cat-M1 system information that directs the Cat-M1 UEs 110 to different access resources on the RACH than legacy UEs 110A.

The method 400 proceeds at step 410 where the at least one processor statically allocates PUCCH resources, from the predefined sets (from optional step 404), for the plurality of UEs 110 (e.g., in specific subframe offsets and in a way that complies with all the constraints described above) based on whether the respective UE 110 is a legacy UE 110A or a Cat-M1 UE 110. In other words, the PUCCH resources are statically allocated to each UE 110, at least in part, based on whether or not the respective UE 110 is configured to switch frequencies from a first slot 228 in a subframe 224 to a second slot 228 in the subframe 224.

Upon each UE 110 connecting to the cell, the at least one processor selects (1) the SRS offset (the frame within SRS period and subframe within SRS cadence) and PUCCH resource (from within the predefined set allocated for SRS for that type of UE 110) for the UE's SRS; (2) the SR offset and the PUCCH resource (from within the predefined set allocated for SRs for that type of UE 110) for the UE's SR; (3) the CQI offset and the PUCCH resource (from within the predefined set allocated for CQI for that type of UE 110) for the UE's CQI; (4) a DRX offset and measurement gap offset for the UE 110 such that all reporting opportunities are included in the DRX-ON time for the UE 110, and do not coincide with the UE's measurement gap.

In some configurations, an SRS resource is selected for the UE 110 on a frame and subframe 224, where an SRS opportunity exists within the cell, wherein the subframe 224 can also be used for simultaneous transmission of HARQ or SRs but not for transmitting CQI (CSI).

Step 410 includes identifying two PUCCH resources, each sharing the same orthogonal code sequence and located in a different resource block 226 of adjacent slots 228 of a subframe 224. The two PUCCH resources may share the same orthogonal code sequence. Even though the different RBs 226 would have the same RB index (e.g., m=0), the different resource blocks 226 may or may not be transmitted on the same frequency subcarriers. For example, the resource blocks 226 in adjacent slots 228 may be transmitted on the same or different physical resource blocks (PRBs).

Step 410 also includes statically allocating the two identified PUCCH resources (sharing the same orthogonal code sequence and located in a different resource block 226 of adjacent slots 228 of a subframe 224) to two of the plurality of UEs 110 of the same type (a first PUCCH resource to a first UE 110 and a second PUCCH resource to a second UE 110). Both of the identified PUCCH resources are allocated to UEs 110 that are either legacy UEs 110A or Cat-M1 UEs 110B. Static allocation may be used for Format-1 PUCCH resources, such as scheduling requests (SR), and channel quality indicators (CQI), both of which are considered uplink control information (UCI). For static allocation, the network (e.g., a baseband controller 104) may assign a static PUCCH resource index to UEs 110 soon after they initially connect to a cell. The base station 100 may send the static allocation to the at least two UEs 110 in an RRC Configuration message during UE 110 connection setup. Then, changes in the static allocation is sent in RRC reconfiguration messages. It is understood that other signaling may be used to notify the UEs 110 of their static allocations.

The method 400 proceeds at optional step 412 where, when one of the plurality of UEs 110 disconnects from the cell, the at least one processor reassigns its PUCCH resources to a newly-connected UE 110 of the same type (legacy or Cat-M1). This may include repeating at least portions of steps 408 and/or 410 for the newly-connected UE 110.

Therefore, the pairwise allocation described herein may be used with the initial static allocation of PUCCH resources as a cell becomes operational (e.g., as in step 410) and/or in the re-allocation of those PUCCH resources after UEs 110 subsequently disconnect from the cell (e.g., as in optional step 412).

Dynamic Allocation of PUCCH Resource Pairs

FIG. 5 is a flow diagram illustrating a method 500 for dynamically allocating resources on an uplink control channel, e.g., PUCCH. The method 500 may be performed by at least one UE 110 and a base station 100 in a wireless communication system 101A, e.g., implementing a 3GPP LTE air interface. For example, the base station 100 may be a small cell 100B, a macro base station 100C, or a baseband controller 104 in a C-RAN 100A. Each of the at least one UE 110 and base station 100 may implement the method 500 using at least one processor executing instructions stored on at least one memory.

While the method 400 of FIG. 4 describes static allocation, PUCCH resources are also dynamically allocated for hybrid automatic repeat request (HARQ) messages from UEs 110 (used to acknowledge whether a UE 110 successfully decoded the PDSCH transmissions in its PDSCH allocation). Accordingly, the method 500 in FIG. 5 describes this dynamic allocation of PUCCH resources.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that method 500 can and typically would include such exception handling.

The method 500 begins at optional step 502 where the base station 100 receives information separately indicating a type (legacy UE 110A or Cat-M1 UE 110B) of each of a plurality of UEs 110 connected to a cell implemented by the base station 100. As before, legacy UEs 110A are configured to switch frequencies from the first slot 228 in a subframe 224 to the second slot 228 in the same subframe 224, while Cat-M1 UEs 110B are not configured to switch frequencies from the first slot 228 in a subframe 224 to the second slot 228 in the same subframe 224.

The method 500 proceeds at optional step 504 where the base station 100 broadcasts a system information block (SIB) to the plurality of UEs 110 connected to the cell (or connected to another cell in the vicinity such that re-selecting or handing over to this cell may become necessary), where the SIB indicates a region of resources on an uplink control channel (e.g., PUCCH resources) reserved for hybrid automatic repeat request (HARQ) messages. When a UE 110 has to send a HARQ message, it receives (in the SIB that is broadcast to all UEs 110) an indication where the region of consecutive PUCCH resources for HARQ begins. For example, the HARQ region may be indicated by a first PUCCH resource in the HARQ region (a beginning of the HARQ region). Furthermore, UEs 110 may determine a number of PUCCH resources in the HARQ region (the size of the HARQ region) from the total number of CCEs available. For example, the SIB may indicate that the HARQ region begins at PUCCH resource index 30, and 20 total PUCCH resources are reserved for dynamic HARQ resources. The HARQ region can span multiple resource blocks (RBs) 226 or not. In examples, the HARQ region will have periodic gaps in case the DCI is always sent with aggregation level >1.

The method 500 proceeds at step 506 where the base station 100 sends, to each of at least one of the plurality of UEs 110, a respective Physical Downlink Shared Channel (PDSCH) allocation in a downlink subframe (e.g., on the PDCCH), where the position of the channel control element(s) (CCE(s)) carrying the PDSCH allocation for a particular UE 110 within the downlink subframe indicates an index of a dynamically-allocated PUCCH resource in the region (reserved for HARQ messages) of a subsequent uplink subframe. For example, the position of the PDSCH allocation within a downlink subframe 224 may indicate an index in a HARQ region of a subsequent uplink subframe 224.

Figure 6:
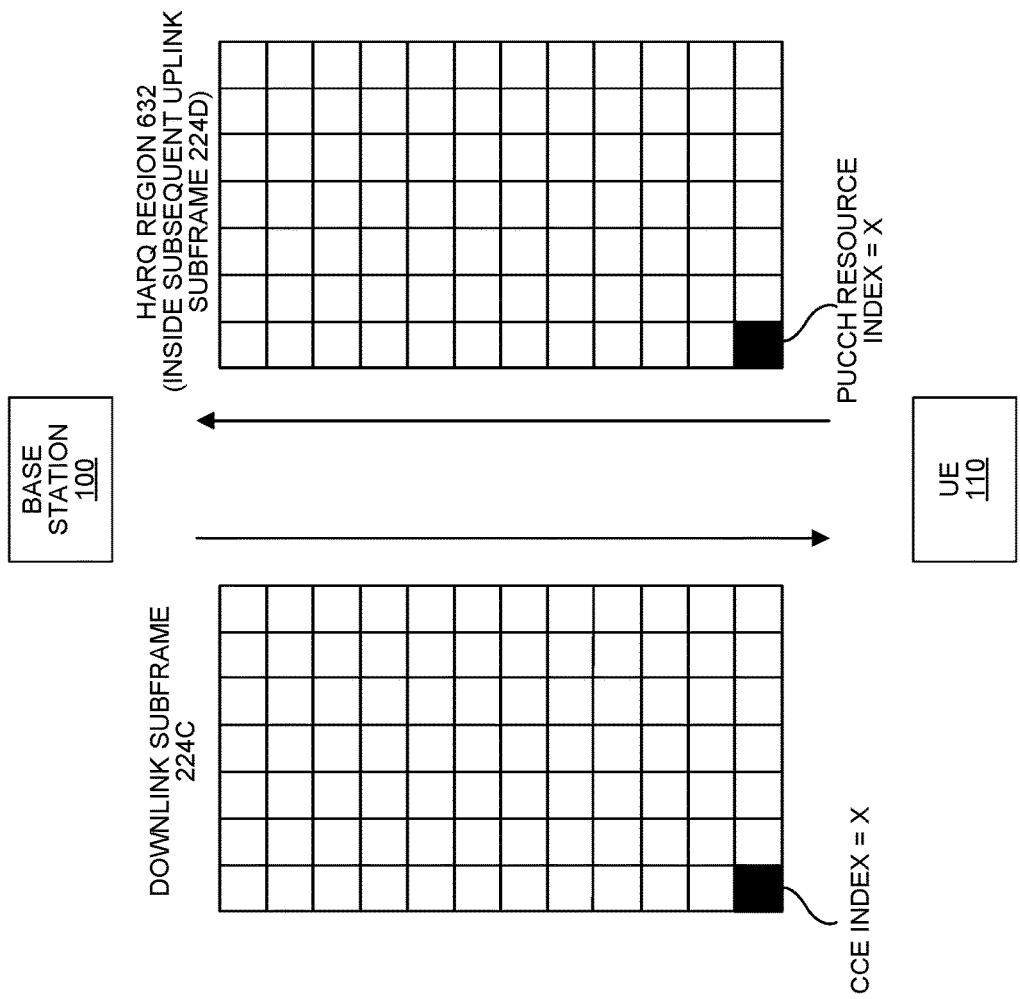
FIG. 6 is a block diagram illustrating mapping between a channel control element (CCE) index in a downlink subframe and a PUCCH resource index in the HARQ region of a subsequent uplink subframe.

FIG. 6 is a block diagram illustrating mapping between a channel control element (CCE) index in a downlink subframe 224C (e.g., one the PDCCH) and a PUCCH resource index in the HARQ region 632 of a subsequent uplink subframe 224D. In other words, FIG. 6 illustrates how the index of the CCE carrying the PDSCH allocation in the downlink subframe 224C is the same as the PUCCH resource index inside the HARQ region 632 of the subsequent uplink subframe 224D, e.g., both indices shown as X in FIG. 6. The subsequent uplink subframe 224D may be six subframes 224 after the downlink subframe 224C (e.g., on the PDCCH) with the PDSCH allocation or any other suitable number. When sending a PDSCH allocation to a particular UE 110, a base station 100 may encode the channel control element(s) (CCE(s)) carrying the PDSCH allocation with the particular UE's 110 Radio Network Temporary Identifier (RNTI).

The downlink subframe 224C and HARQ region 632 in FIG. 6 are merely exemplary and should not be seen as limiting, e.g., the downlink subframe 224C could have a different number of CCEs and the HARQ region 632 may utilize a different number of PUCCH resources. Furthermore, as discussed below, more than one CCE could be used to transmit a PDSCH allocation in a downlink subframe 224C, depending on the aggregation level for a UE 110.

Returning to FIG. 5, the method 500 proceeds at step 508 where each of the at least one UE 110 determines a respective dynamically-allocated PUCCH resource within the HARQ region 632 (reserved for HARQ messages) based on the position of the respective CCE(s) carrying the PDSCH allocation for the respective UE 110. For example, each UE 110 may search the CCEs (in the downlink subframe 224C) until it identifies one that was encoded using its RNTI, e.g., the identified CCE(s) will decode using the UE's 110 RNTI, while the others (not intended for it) will not. The index of the identified CCE(s) on the PDCCH (that was used to allocate to the UE 110) is then used as an index into the HARQ region 632 of PUCCH resources in the subsequent uplink subframe 224D (e.g., six subframes later). Depending on the Control Format Indicator (CFI) value for the downlink subframe 224C carrying the PDSCH allocation, the UE 110 may have to search up to 84 CCEs (for CFI=3), 40 CCEs (for CFI=2), or 20 CCEs (for CFI=1) to find the CCE(s) that can be decoded using its RNTI. Therefore, with reference to FIG. 6, the blacked out CCE(s) (index=X) in the downlink subframe 224C will be the one that decodes using the UE's 110 RNTI. Once the UE's 110 CCE(s) in the downlink is identified, the UE 110 can then transmit its HARQ message on the PUCCH resource in the HARQ region 632 of PUCCH resources in the subsequent uplink subframe 224D (and indicated by the identified index).

The method 500 proceeds at step 510 where, for at least one of the dynamically-allocated PUCCH resources, the base station 100 allocates a corresponding paired PUCCH resource, if any, to another UE 110 of the same type as the UE 110 that was allocated the respective dynamically-allocated PUCCH resource. In other words, a dynamically-allocated PUCCH resource and its corresponding paired PUCCH resource would both be allocated to (1) legacy UEs 110A; or (2) Cat-M1 UEs 110B. Paired PUCCH resources have the same orthogonal code sequence and are located in resource blocks 226 of adjacent slots 228 of a subframe 224, where both resource blocks 226 have the same RB index (e.g., m=0) but are not required to be transmitted on the same frequency subcarriers. Therefore, if a dynamically-allocated PUCCH resource was allocated to a Cat-M1 UE 110B (via downlink signaling in step 506), a corresponding paired PUCCH resource will have to be allocated to another Cat-M1 UE 110B, either as a static or dynamic resource.

If a corresponding paired PUCCH resource is being statically allocated, it may be done similar to optional step 406 in the method 400 of FIG. 4. On the other hand, if a corresponding paired PUCCH resource is being dynamically allocated to a UE 110, it may be done similar to steps 506-508 in the method 500 of FIG. 5, e.g., where (1) the index of CCE(s) carrying a PDSCH allocation for the UE 110 in a downlink subframe 224C is used as an index into a HARQ region 632 in a subsequent uplink subframe 224D (step 506); and (2) the UE 110 identifies the CCE (and its index) carrying the UE's 110 PDSCH allocation by decoding the CCE using the UE's 110 RNTI (step 508).

Figure 7:
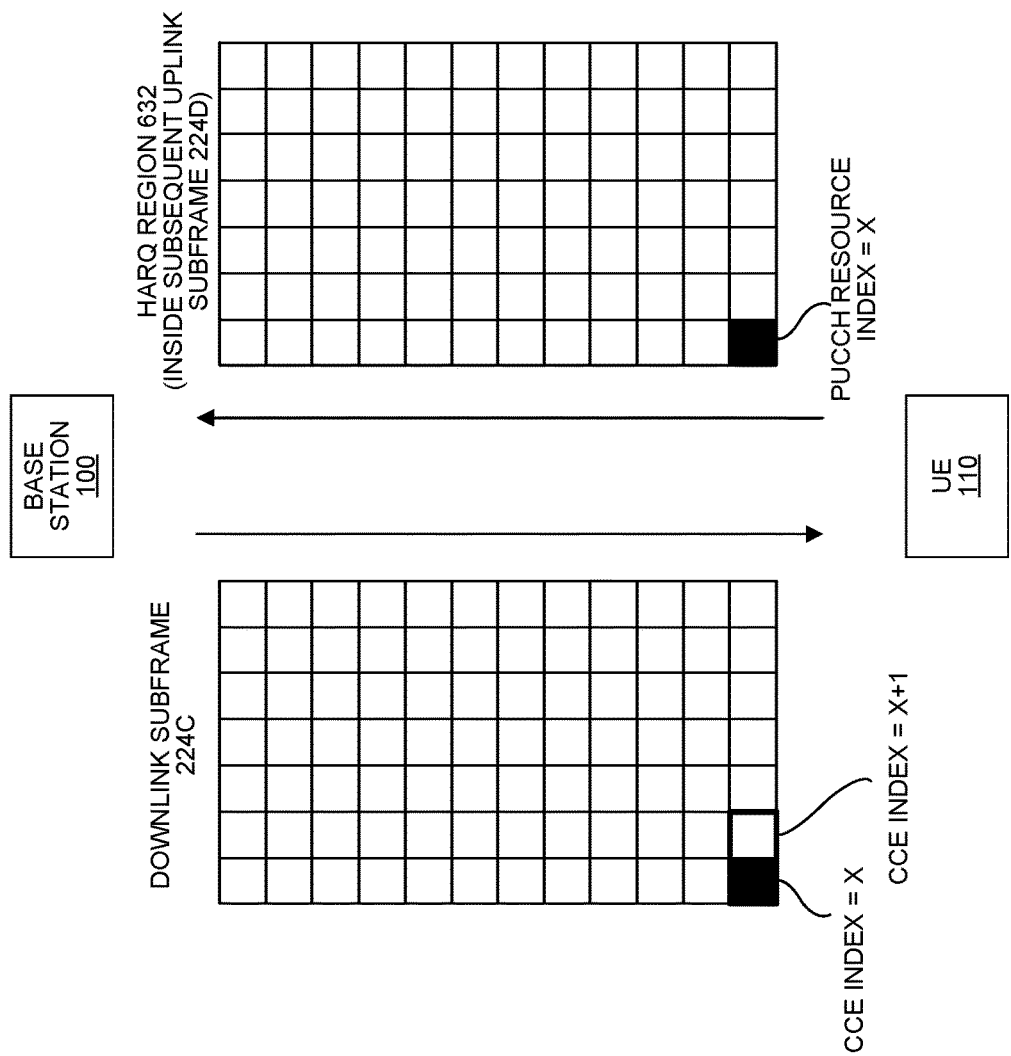
FIG. 7 is a block diagram illustrating mapping between a CCE index and a PUCCH resource index in the HARQ region where the minimum aggregation level is greater than one.

FIG. 7 is a block diagram illustrating mapping between a CCE index (in a downlink subframe 224C) and a PUCCH resource index in the HARQ region 632 (of a subsequent uplink subframe 224D) where the minimum aggregation level is greater than one, e.g., 2, 4, or 8. When dynamically allocating PUCCH resources (e.g., using the PDDCH), the "aggregation level" indicates a number of consecutive CCEs used to send information to a particular UE 110. For example, where the aggregation level 1, 2, 4, or 8, then the base station 100 will use 1, 2, 4, or 8 consecutive CCEs, respectively, to send information to one UE 110. For example, if the aggregation level for a UE 110 was 8, the UE's 110 PDSCH allocation may be signaled in 8 consecutive CCEs. Generally, higher aggregation levels result in better reliability (at the expense of greater overhead usage). The range of aggregation level is typically set statically by the base station 100 for all UEs 110 connected to a cell. But then for every DL control message, the base station 100 dynamically selects the aggregation level within that range. The UE 110 may not know the aggregation level in advance and may have to exhaustively decode all possible aggregation levels.

FIG. 6 is illustrated with an aggregation level of 1, i.e., a single CCE is used to send a PDSCH allocation to a particular UE 110. In contrast, FIG. 7 is illustrated with an aggregation level of 2, e.g., 2 consecutive CCEs are used to send a PDSCH allocation to a particular UE 110. Accordingly, with reference to FIG. 7, the UE's 110 PDSCH allocation is signaled not just on the CCE with an index of X, but also X+1. In this situation, only the first CCE's index (X in this case) would be used as the index into the HARQ region 632.

Similarly, if the UE's 110 aggregation level was 4, the UE's 110 PDSCH allocation would be signaled on the CCEs with indices of X, X+1, X+2, and X+3. As before, only the first CCE's index (X in this case) would be used as the index into the HARQ region 632.

A special case arises when the HARQ region 632 spans multiple resource blocks 226 in the subsequent uplink subframe 224D. If the minimum aggregation level is 2 for both legacy UEs 110A and Cat-M1 UEs 110B, the legacy UEs 110A will use even-indexed PUCCH resources (with indices corresponding to the CCEs used to send a PDSCH allocation to a particular legacy UE 110A) for its HARQ message. Similarly, the Cat-M1 UEs 110B will need to only use the odd-indexed PUCCH resources (with indices corresponding to the CCEs used to send a PDSCH allocation to a particular Cat-M1 UE 110B) for its HARQ response. This is only the case for when the HARQ region spans multiple resource blocks 226, which likely only occurs when CFI is set to 2 or 3. Alternatively, the legacy UEs 110A could use the odd-indexed PUCCH resources and the Cat-M1 UEs 110B could use the even-indexed PUCCH resources.

In other words, when the HARQ region 632 spans multiple resource blocks 226 in the subsequent uplink subframe 224D and a minimum aggregation level for the UEs 110 is greater than one: (1) PUCCH resources corresponding to even-indexed CCEs that carry the PDSCH allocation for a particular UE 110 are only allocated to a first type of UE 110 (legacy UEs 110A or Cat-M1 UEs 110B); and (2) PUCCH resources corresponding to odd-indexed CCEs that carry a downlink shared channel allocation are only allocated to a second type of UE 110 (legacy UEs 110A or Cat-M1 UEs 110B). Put another way, when the HARQ region 632 spans multiple resource blocks 226 in the subsequent uplink subframe 224D and a minimum aggregation level for the UEs 110 is greater than one: (1) PUCCH resources corresponding to even-indexed CCEs that carry the PDSCH allocation for a particular UE 110 are only allocated to a first type of UE 110 (where the start index of the HARQ region for the first type of UE 110 would be an evenly-numbered CCE); and (2) PUCCH resources corresponding to even-indexed CCEs that carry a downlink shared channel allocation are only allocated to a second type of UE 110 (where the start index of the HARQ region for the second type of UE 110 would be an oddly-numbered CCE).

It should be noted that the special case may also extend to scenarios where both legacy and Cat-M1 HARQ regions are confined to the same RB 226 with both minimum aggregation levels >1 (of course, every legacy resource would be mapped to multiple PRBs due to the frequency switch).

Usually, and without limitation, when (1) the HARQ region 632 is contained to a single resource block 226 (e.g., CFI=1 with small LTE channel 200 width, so the number of CCEs used for PDSCH allocation is 20); and (2) additional statically-allocated PUCCH resources (that spanned beyond the single HARQ region) weren't needed: the odd-indexed PUCCH resources of a PUCCH resource pair aren't necessarily restricted to only a particular type of UE 110 and the even-indexed PUCCH resources of a pair aren't necessarily restricted to only a particular type of UE 110.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

TERMINOLOGY

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

In conclusion, the present disclosure provides novel systems, methods, and arrangements for spectrum-efficient utilization of an uplink control channel. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLES

Example 1 includes a communication system for statically allocating physical uplink control channel (PUCCH) resources on a PUCCH, comprising: a base station configured to: exchange radio frequency (RF) signals with a plurality of user equipment terminals (UEs); determine whether or not each of the plurality of UEs, connected to a cell implemented by the base station, is configured to switch frequencies from a first slot in a subframe to a second slot in the subframe; and statically allocate PUCCH resources, from predefined sets of PUCCH resources, for each of the plurality of UEs based on whether or not the respective UE is configured to switch frequencies from a first slot in a subframe to a second slot in the subframe.

Example 2 includes the communication system of Example 1, wherein the base station is configured to statically allocate by identifying two of the PUCCH resources, each sharing the same orthogonal code sequence and located in a different resource block of adjacent slots of a particular subframe.

Example 3 includes the communication system of Example 2, wherein the base station is configured to statically allocate the two identified PUCCH resources to two of the plurality of UEs of the same type, both UEs being configured to switch frequencies from a first slot in a subframe to a second slot in the subframe or both being configured to not switch frequencies from the first slot in a subframe to the second slot in the subframe.

Example 4 includes the communication system of any of Examples 1-3, wherein the base station is provisioned with cell parameters before it begins transmission to the UEs.

Example 5 includes the communication system of any of Examples 1-4, wherein the base station is configured to determine, from a plurality of PUCCH resources, how many total PUCCH resources are required for each of two types of UEs and each of at least one type of uplink reporting.

Example 6 includes the communication system of any of Examples 1-5, wherein each PUCCH resource is one of a plurality of orthogonal code sequences that allows multiple UEs to transmit on a same resource block of the PUCCH.

Example 7 includes the communication system of any of Examples 1-6, wherein the base station is configured to, when one of the plurality of UEs disconnects from the cell, reassign its PUCCH resources to a newly-connected UE of a same type.

Example 8 includes the communication system of any of Examples 1-7, wherein the base station is further configured to receive a scheduling request (SR) or a channel quality indication (CQI) on either or both of the statically-allocated PUCCH resources.

Example 9 includes the communication system of any of Examples 1-8, wherein a resource block (RB) used by the communication system supports up to 36 Format-1 uplink messages.

Example 10 includes the communication system of any of Examples 1-9, wherein a resource block (RB) used by the communication system supports up to 12 Format-2 uplink messages.

Example 11 includes the communication system of any of Examples 1-10, wherein the PUCCH resources repeat in multiple uplink subframes; wherein, when one of the plurality of UEs connects to the cell, uplink frames and uplink subframes are selected for the UE to transmit uplink information in, subject to constraints.

Example 12 includes the communication system of Example 11, wherein the uplink frames and subframes comprise any of the following: a frame and a subframe for the UE to transmit a Sounding Reference Signal (SRS) on; a frame and a subframe for the UE to transmit Scheduling Requests (SRs) on; and a frame and a subframe for the UE to transmit Channel Quality Information (CQI) on.

Example 13 includes the communication system of any of Examples 11-12, wherein an SRS resource is selected for the UE on a frame and subframe, wherein an SRS opportunity exists within the cell, wherein the subframe can also be used for simultaneous transmission of HARQ or SRs but not for transmitting CQI; wherein a PUCCH resource is selected for the SRs from within a predefined set of PUCCH resources allocated for SRs transmissions from UEs of the same type as the UE; wherein a PUCCH resource is selected for the CQI from within a predefined set of PUCCH resources allocated for CQI transmissions from UEs of the same type as the UE.

Example 14 includes the communication system of any of Examples 11-13, wherein the constraints comprise any of the following restrictions: a PUCCH resource, in at least one of the uplink subframes in each uplink frame with an SRS opportunity configured in the cell, is allocated to the UE to transmit a Sounding Reference Signal (SRS) while the UE is connected to the cell; wherein PUCCH resources are allocated in at least one of the same uplink subframes for both legacy UEs and Cat-M1 UEs to transmit SRS; and wherein an SRS configuration constrains which of the uplink subframes are Cat-M1 uplink subframes.

Example 15 includes the communication system of any of Examples 11-14, wherein the constraints comprise any of the following restrictions: the UE does not transmit Channel State Information (CSI) on a PUCCH resource in the same uplink subframe as a PUCCH resource the UE transmits SRS on; the UE does not transmit Scheduling Requests (SRs) on a PUCCH resource in the same uplink subframe as a PUCCH resource the UE transmits Channel State Information (CSI) on; and SRS resources allocated to the UE for transmitting an SRS, the CSI, and the SRs are located in the UE's Discontinuous Reception (DRX) ON period and not located in the UE's Measurement Gap (MG).

Example 16 includes a method for statically allocating physical uplink control channel (PUCCH) resources on a PUCCH, the method being performed by a base station, the method comprising: exchanging radio frequency (RF) signals with a plurality of user equipment terminals (UEs); determining whether or not each of the plurality of UEs, connected to a cell implemented by the base station, is configured to switch frequencies from a first slot in a subframe to a second slot in the subframe; and statically allocating PUCCH resources, from predefined sets of PUCCH resources, for each of the plurality of UEs based on whether or not the respective UE is configured to switch frequencies from a first slot in a subframe to a second slot in the subframe.

Example 17 includes the method of Example 16, wherein the static allocation comprises identifying two of the PUCCH resources, each sharing the same orthogonal code sequence and located in a different resource block of adjacent slots of a particular subframe.

Example 18 includes the method of Example 17, wherein the static allocation further comprises statically allocating the two identified PUCCH resources to two of the plurality of UEs of the same type, both UEs being configured to switch frequencies from a first slot in a subframe to a second slot in the subframe or both being configured to not switch frequencies from the first slot in a subframe to the second slot in the subframe.

Example 19 includes the method of any of Examples 16-18, further comprising provisioning the base station with cell parameters before it begins transmission to the UEs.

Example 20 includes the method of any of Examples 16-19, further comprising determining, from a plurality of PUCCH resources, how many total PUCCH resources are required for each of two types of UEs and each of at least one type of uplink reporting.

Example 21 includes the method of any of Examples 16-20, wherein each PUCCH resource is one of a plurality of orthogonal code sequences that allows multiple UEs to transmit on a same resource block of the PUCCH.

Example 22 includes the method of any of Examples 16-21, further comprising, when one of the plurality of UEs disconnects from the cell, reassigning its PUCCH resources to a newly-connected UE of a same type.

Example 23 includes the method of any of Examples 16-22, further comprising receiving a scheduling request (SR) or a channel quality indication (CQI) on either or both of the statically-allocated PUCCH resources.

Example 24 includes the method of any of Examples 16-23, wherein a resource block (RB) used by the base station supports up to 36 Format-1 uplink messages.

Example 25 includes the method of any of Examples 16-24, wherein a resource block (RB) used by the base station supports up to 12 Format-2 uplink messages.

Example 26 includes the method of any of Examples 16-25, wherein the PUCCH resources repeat in multiple uplink subframes; wherein, when one of the plurality of UEs connects to the cell, uplink frames and uplink subframes are selected for the UE to transmit uplink information in, subject to constraints.

Example 27 includes the method of Example 26, wherein the uplink frames and subframes comprise any of the following: a frame and a subframe for the UE to transmit a Sounding Reference Signal (SRS) on; a frame and a subframe for the UE to transmit Scheduling Requests (SRs) on; and a frame and a subframe for the UE to transmit Channel Quality Information (CQI) on.

Example 28 includes the method of any of Examples 26-27, wherein an SRS resource is selected for the UE on a frame and subframe, wherein an SRS opportunity exists within the cell, wherein the subframe can also be used for simultaneous transmission of HARQ or SRs but not for transmitting CQI; wherein a PUCCH resource is selected for the SRs from within a predefined set of PUCCH resources allocated for SRs transmissions from UEs of the same type as the UE; wherein a PUCCH resource is selected for the CQI from within a predefined set of PUCCH resources allocated for CQI transmissions from UEs of the same type as the UE.

Example 29 includes the method of any of Examples 26-28, wherein the constraints comprise any of the following restrictions: a PUCCH resource, in at least one of the uplink subframes in each uplink frame with an SRS opportunity configured in the cell, is allocated to the UE to transmit a Sounding Reference Signal (SRS) while the UE is connected to the cell; wherein PUCCH resources are allocated in at least one of the same uplink subframes for both legacy UEs and Cat-M1 UEs to transmit SRS; and wherein an SRS configuration constrains which of the uplink subframes are Cat-M1 uplink subframes.

Example 30 includes the method of any of Examples 26-29, wherein the constraints comprise any of the following restrictions: the UE does not transmit Channel State Information (CSI) on a PUCCH resource in the same uplink subframe as a PUCCH resource the UE transmits SRS on; the UE does not transmit Scheduling Requests (SRs) on a PUCCH resource in the same uplink subframe as a PUCCH resource the UE transmits Channel State Information (CSI) on; and SRS resources allocated to the UE for transmitting an SRS, the CSI, and the SRs are located in the UE's Discontinuous Reception (DRX) ON period and not located in the UE's Measurement Gap (MG).

Example 31 includes a communication system for dynamically allocating physical uplink control channel (PUCCH) resources on a PUCCH, comprising: a base station configured to: send, to each of at least one of a plurality of user equipment terminals (UEs), a respective downlink shared channel allocation in a downlink subframe, where the position of at least one channel control element (CCE) carrying the downlink shared channel allocation for a particular UE in the downlink subframe indicates an index of a dynamically-allocated PUCCH resource in a hybrid automatic repeat request (HARQ) region of a subsequent uplink subframe; the plurality of UEs, each configured to exchange radio frequency (RF) signals with a plurality of UEs, each UE being a legacy UE or Category-M1 (Cat-M1) UE, wherein, each of the at least one UE is configured to determine a respective dynamically-allocated PUCCH resource in the HARQ region of PUCCH resources based on the position of the respective at least one CCE carrying the downlink shared channel allocation for the respective UE; and wherein the base station is further configured to, for at least one of the dynamically-allocated PUCCH resources, allocate a corresponding paired PUCCH resource to another UE of the same type as the UE that was allocated the respective dynamically-allocated PUCCH resource.

Example 32 includes the communication system of Example 31, wherein legacy UEs are configured to switch frequencies from a first slot in the subframe to a second slot in the subframe; and wherein Cat-M1 UEs are not configured to switch frequencies from the first slot in the subframe to the second slot in the subframe.

Example 33 includes the communication system of any of Examples 31-32, wherein the base station is further configured to broadcast a system information block (SIB) to the plurality of UEs connected to a cell implemented by the base station, wherein the SIB indicates a beginning and a size of the HARQ region on the PUCCH.

Example 34 includes the communication system of any of Examples 31-33, wherein the base station is further configured to receive information separately indicating whether each of the plurality of UEs is a legacy UE or a Cat-M1 UE.

Example 35 includes the communication system of any of Examples 31-34, wherein each PUCCH resource is one of a plurality of orthogonal code sequences that allows multiple UEs to transmit on a same resource block of the PUCCH.

Example 36 includes the communication system of any of Examples 31-35, wherein the base station is further configured to receive hybrid automatic repeat request (HARQ) messages on the dynamically-allocated PUCCH resources.

Example 37 includes the communication system of any of Examples 31-36, wherein when a minimum aggregation level, for a particular one or more of the plurality of UEs, is set at 2, 4, or 8, the at least one CCE carrying the downlink shared channel allocation is 2, 4, or 8 CCEs, respectively.

Example 38 includes the communication system of any of Examples 31-37, wherein when the HARQ region spans multiple resource blocks in the subsequent uplink subframe and a minimum aggregation level for the plurality of UEs is greater than one: PUCCH resources corresponding to even-indexed CCEs that carry a downlink shared channel allocation are only allocated to a first type of UE; and PUCCH resources corresponding to odd-indexed CCEs that carry a downlink shared channel allocation are only allocated to a second type of UE.

Example 39 includes a method for dynamically allocating physical uplink control channel (PUCCH) resources on a PUCCH, comprising: sending, from a base station to each of at least one of a plurality of user equipment terminals (UEs), a respective downlink shared channel allocation in a downlink subframe, where the position of at least one channel control element (CCE) carrying the downlink shared channel allocation for a particular UE in the downlink subframe indicates an index of a dynamically-allocated PUCCH resource in a hybrid automatic repeat request (HARQ) region of a subsequent uplink subframe; determining, at each of the at least one UE, a respective dynamically-allocated PUCCH resource in the HARQ region of PUCCH resources based on the position of the respective at least one CCE carrying the downlink shared channel allocation for the respective UE; and allocating, by the base station and for at least one of the dynamically-allocated PUCCH resources, a corresponding paired PUCCH resource to another UE of the same type as the UE that was allocated the respective dynamically-allocated PUCCH resource.

Example 40 includes the method of Example 39, wherein legacy UEs are configured to switch frequencies from a first slot in the subframe to a second slot in the subframe; and wherein Cat-M1 UEs are not configured to switch frequencies from the first slot in the subframe to the second slot in the subframe.

Example 41 includes the method of any of Examples 39-40, further comprising broadcasting a system information block (SIB) to the plurality of UEs connected to a cell implemented by the base station, wherein the SIB indicates a beginning and a size of the HARQ region on the PUCCH.

Example 42 includes the method of any of Examples 39-41, further comprising receiving information separately indicating whether each of the plurality of UEs is a legacy UE or a Cat-M1 UE.

Example 43 includes the method of any of Examples 39-42, wherein each PUCCH resource is one of a plurality of orthogonal code sequences that allows multiple UEs to transmit on a same resource block of the PUCCH.

Example 44 includes the method of any of Examples 39-43, further comprising receiving hybrid automatic repeat request (HARQ) messages on the dynamically-allocated PUCCH resources.

Example 45 includes the method of any of Examples 39-44, wherein when a minimum aggregation level, for a particular one or more of the plurality of UEs, is set at 2, 4, or 8, the at least one CCE carrying the downlink shared channel allocation is 2, 4, or 8 CCEs, respectively.

Example 46 includes the method of any of Examples 39-45, wherein when the HARQ region spans multiple resource blocks in the subsequent uplink subframe and a minimum aggregation level for the plurality of UEs is greater than one: PUCCH resources corresponding to even-indexed CCEs that carry a downlink shared channel allocation are only allocated to a first type of UE; and PUCCH resources corresponding to odd-indexed CCEs that carry a downlink shared channel allocation are only allocated to a second type of UE.

The invention claimed is:

1. A communication system for statically allocating physical uplink control channel (PUCCH) resources on a PUCCH, comprising:
    a base station configured to:
        exchange radio frequency (RF) signals with a plurality of user equipment terminals (UEs);
        determine whether or not each of the plurality of UEs, connected to a cell implemented by the base station, has been configured to switch frequencies from a first slot in a subframe to a second slot in the subframe based on capabilities of each of the plurality of UEs; and
        statically allocate PUCCH resources, from predefined sets of PUCCH resources, for each of the plurality of UEs based on whether or not the respective UE has been configured to switch frequencies from a first slot in a subframe to a second slot in the subframe;
    wherein the PUCCH resources are grouped in pairs, the two PUCCH resources in a respective pair allocated to two of the plurality of UEs of a same type, both of the UEs having been configured to switch frequencies from the first slot in the subframe to a second slot in the subframe or both of the UEs having been configured to not switch frequencies from the first slot in the subframe to the second slot in the subframe.

2. The communication system of claim 1, wherein the two PUCCH resources in a respective pair share the same orthogonal code sequence.

3. The communication system of claim 1, wherein the base station is provisioned with cell parameters before it begins transmission to the UEs.

4. The communication system of claim 1, wherein the base station is configured to determine, from a plurality of PUCCH resources, how many total PUCCH resources are required for each of two types of UEs and each of at least one type of uplink reporting.

5. The communication system of claim 1, wherein each PUCCH resource is one of a plurality of orthogonal code sequences that allows multiple UEs to transmit on a same resource block of the PUCCH.

6. The communication system of claim 1, wherein the base station is configured to, when one of the plurality of UEs disconnects from the cell, reassign its PUCCH resources to a newly-connected UE of a same type.

7. The communication system of claim 1, wherein the base station is further configured to receive a scheduling request (SR) or a channel quality indication (CQI) on either or both of the statically-allocated PUCCH resources.

8. The communication system of claim 1, wherein a resource block (RB) used by the communication system supports up to 36 Format-1 uplink messages.

9. The communication system of claim 1, wherein a resource block (RB) used by the communication system supports up to 12 Format-2 uplink messages.

10. The communication system of claim 1,
    wherein the PUCCH resources repeat in multiple uplink subframes;
    wherein, when one of the plurality of UEs connects to the cell, uplink frames and uplink subframes are selected for the UE to transmit uplink information in, subject to constraints.

11. The communication system of claim 10, wherein the uplink frames and subframes comprise any of the following:
    a frame and a subframe for the UE to transmit a Sounding Reference Signal (SRS) on;
    a frame and a subframe for the UE to transmit Scheduling Requests (SRs) on; and
    a frame and a subframe for the UE to transmit Channel Quality Information (CQI) on.

12. The communication system of claim 10,
    wherein an SRS resource is selected for the UE on a frame and subframe, wherein an SRS opportunity exists within the cell, wherein the subframe can also be used for simultaneous transmission of HARQ or SRs but not for transmitting CQI;

wherein a PUCCH resource is selected for the SRs from within a predefined set of PUCCH resources allocated for SRs transmissions from UEs of the same type as the UE;

wherein a PUCCH resource is selected for the CQI from within a predefined set of PUCCH resources allocated for CQI transmissions from UEs of the same type as the UE.

13. The communication system of claim 10, wherein the constraints comprise any of the following restrictions:

a PUCCH resource, in at least one of the uplink subframes in each uplink frame with an SRS opportunity configured in the cell, is allocated to the UE to transmit a Sounding Reference Signal (SRS) while the UE is connected to the cell;

wherein PUCCH resources are allocated in at least one of the same uplink subframes for both legacy UEs and Cat-M1 UEs to transmit SRS; and wherein an SRS configuration constrains which of the uplink subframes are Cat-M1 uplink subframes.

14. The communication system of claim 10, wherein the constraints comprise any of the following restrictions:

the UE does not transmit Channel State Information (CSI) on a PUCCH resource in the same uplink subframe as a PUCCH resource the UE transmits SRS on;

the UE does not transmit Scheduling Requests (SRs) on a PUCCH resource in the same uplink subframe as a PUCCH resource the UE transmits Channel State Information (CSI) on; and SRS resources allocated to the UE for transmitting an SRS, the CSI, and the SRs are located in the UE's Discontinuous Reception (DRX) ON period and not located in the UE's Measurement Gap (MG).

15. A method for statically allocating physical uplink control channel (PUCCH) resources on a PUCCH, the method being performed by a base station, the method comprising:

exchanging radio frequency (RF) signals with a plurality of user equipment terminals (UEs);

determining whether or not each of the plurality of UEs, connected to a cell implemented by the base station, has been configured to switch frequencies from a first slot in a subframe to a second slot in the subframe based on capabilities of each of the plurality of UEs; and statically allocating PUCCH resources, from predefined sets of PUCCH resources, for each of the plurality of UEs based on whether or not the respective UE has been configured to switch frequencies from a first slot in a subframe to a second slot in the subframe;

wherein the PUCCH resources are grouped in pairs, the two PUCCH resources in a respective pair allocated to two of the plurality of UEs of a same type, both of the UEs having been configured to switch frequencies from the first slot in the subframe to a second slot in the subframe or both of the UEs having been configured to not switch frequencies from the first slot in the subframe to the second slot in the subframe.

16. The method of claim 15, wherein the the two PUCCH resources in a respective pair share the same orthogonal code sequence.

17. The method of claim 15, further comprising provisioning the base station with cell parameters before it begins transmission to the UEs.

18. The method of claim 15, further comprising determining, from a plurality of PUCCH resources, how many total PUCCH resources are required for each of two types of UEs and each of at least one type of uplink reporting.

19. The method of claim 15, wherein each PUCCH resource is one of a plurality of orthogonal code sequences that allows multiple UEs to transmit on a same resource block of the PUCCH.

20. The method of claim 15, further comprising, when one of the plurality of UEs disconnects from the cell, reassigning its PUCCH resources to a newly-connected UE of a same type.

21. The method of claim 15, further comprising receiving a scheduling request (SR) or a channel quality indication (CQI) on either or both of the statically-allocated PUCCH resources.

22. The method of claim 15, wherein a resource block (RB) used by the base station supports up to 36 Format-1 uplink messages.

23. The method of claim 15, wherein a resource block (RB) used by the base station supports up to 12 Format-2 uplink messages.

24. The method of claim 15, wherein the PUCCH resources repeat in multiple uplink subframes;

wherein, when one of the plurality of UEs connects to the cell, uplink frames and uplink subframes are selected for the UE to transmit uplink information in, subject to constraints.

25. The method of claim 24, wherein the uplink frames and subframes comprise any of the following:

a frame and a subframe for the UE to transmit a Sounding Reference Signal (SRS) on;

a frame and a subframe for the UE to transmit Scheduling Requests (SRs) on; and a frame and a subframe for the UE to transmit Channel Quality Information (CQI) on.

26. The method of claim 24, wherein an SRS resource is selected for the UE on a frame and subframe, wherein an SRS opportunity exists within the cell, wherein the subframe can also be used for simultaneous transmission of HARQ or SRs but not for transmitting CQI;

wherein a PUCCH resource is selected for the SRs from within a predefined set of PUCCH resources allocated for SRs transmissions from UEs of the same type as the UE;

wherein a PUCCH resource is selected for the CQI from within a predefined set of PUCCH resources allocated for CQI transmissions from UEs of the same type as the UE.

27. The method of claim 24, wherein the constraints comprise any of the following restrictions:

a PUCCH resource, in at least one of the uplink subframes in each uplink frame with an SRS opportunity configured in the cell, is allocated to the UE to transmit a Sounding Reference Signal (SRS) while the UE is connected to the cell;

wherein PUCCH resources are allocated in at least one of the same uplink subframes for both legacy UEs and Cat-M1 UEs to transmit SRS; and wherein an SRS configuration constrains which of the uplink subframes are Cat-M1 uplink subframes.

28. The method of claim 24, wherein the constraints comprise any of the following restrictions:

the UE does not transmit Channel State Information (CSI) on a PUCCH resource in the same uplink subframe as a PUCCH resource the UE transmits SRS on;

the UE does not transmit Scheduling Requests (SRs) on a PUCCH resource in the same uplink subframe as a PUCCH resource the UE transmits Channel State Information (CSI) on; and SRS resources allocated to the UE for transmitting an SRS, the CSI, and the SRs are located in the UE's Discontinuous Reception (DRX) ON period and not located in the UE's Measurement Gap (MG).

29. A communication system for dynamically allocating physical uplink control channel (PUCCH) resources on a PUCCH, comprising:

a base station configured to:
send, to each of at least one of a plurality of user equipment terminals (UEs), a respective downlink shared channel allocation in a downlink subframe, where the position of at least one channel control element (CCE) carrying the downlink shared channel allocation for a particular UE in the downlink subframe indicates an index of a dynamically-allocated PUCCH resource in a hybrid automatic repeat request (HARQ) region of a subsequent uplink subframe;

the plurality of UEs, each configured to exchange radio frequency (RF) signals with a plurality of UEs, each UE being a legacy UE or Category-M1 (Cat-M1) UE, wherein, each of the at least one UE is configured to determine a respective dynamically-allocated PUCCH resource in the HARQ region of PUCCH resources based on the position of the respective at least one CCE carrying the downlink shared channel allocation for the respective UE; and wherein the base station is further configured to, for at least one of the dynamically-allocated PUCCH resources, allocate a corresponding paired PUCCH resource to another UE of the same type as the UE that was allocated the respective dynamically-allocated PUCCH resource.

30. The communication system of claim 29,
wherein legacy UEs are configured to switch frequencies from a first slot in the subframe to a second slot in the subframe; and
wherein Cat-M1 UEs are not configured to switch frequencies from the first slot in the subframe to the second slot in the subframe.

31. The communication system of claim 29, wherein the base station is further configured to broadcast a system information block (SIB) to the plurality of UEs connected to a cell implemented by the base station, wherein the SIB indicates a beginning and a size of the HARQ region on the PUCCH.

32. The communication system of claim 29, wherein the base station is further configured to receive information separately indicating whether each of the plurality of UEs is a legacy UE or a Cat-M1 UE.

33. The communication system of claim 29, wherein each PUCCH resource is one of a plurality of orthogonal code sequences that allows multiple UEs to transmit on a same resource block of the PUCCH.

34. The communication system of claim 29, wherein the base station is further configured to receive hybrid automatic repeat request (HARQ) messages on the dynamically-allocated PUCCH resources.

35. The communication system of claim 29, wherein when a minimum aggregation level, for a particular one or more of the plurality of UEs, is set at 2, 4, or 8, the at least one CCE carrying the downlink shared channel allocation is 2, 4, or 8 CCEs, respectively.

36. The communication system of claim 29, wherein when the HARQ region spans multiple resource blocks in the subsequent uplink subframe and a minimum aggregation level for the plurality of UEs is greater than one:
PUCCH resources corresponding to even-indexed CCEs that carry a downlink shared channel allocation are only allocated to a first type of UE; and
PUCCH resources corresponding to odd-indexed CCEs that carry a downlink shared channel allocation are only allocated to a second type of UE.

37. A method for dynamically allocating physical uplink control channel (PUCCH) resources on a PUCCH, comprising:
sending, from a base station to each of at least one of a plurality of user equipment terminals (UEs), a respective downlink shared channel allocation in a downlink subframe, where the position of at least one channel control element (CCE) carrying the downlink shared channel allocation for a particular UE in the downlink subframe indicates an index of a dynamically-allocated PUCCH resource in a hybrid automatic repeat request (HARQ) region of a subsequent uplink subframe;
determining, at each of the at least one UE, a respective dynamically-allocated PUCCH resource in the HARQ region of PUCCH resources based on the position of the respective at least one CCE carrying the downlink shared channel allocation for the respective UE; and
allocating, by the base station and for at least one of the dynamically-allocated PUCCH resources, a corresponding paired PUCCH resource to another UE of the same type as the UE that was allocated the respective dynamically-allocated PUCCH resource.

38. The method of claim 37,
wherein legacy UEs are configured to switch frequencies from a first slot in the subframe to a second slot in the subframe; and
wherein Cat-M1 UEs are not configured to switch frequencies from the first slot in the subframe to the second slot in the subframe.

39. The method of claim 37, further comprising broadcasting a system information block (SIB) to the plurality of UEs connected to a cell implemented by the base station, wherein the SIB indicates a beginning and a size of the HARQ region on the PUCCH.

40. The method of claim 37, further comprising receiving information separately indicating whether each of the plurality of UEs is a legacy UE or a Cat-M1 UE.

41. The method of claim 37, wherein each PUCCH resource is one of a plurality of orthogonal code sequences that allows multiple UEs to transmit on a same resource block of the PUCCH.

42. The method of claim 37, further comprising receiving hybrid automatic repeat request (HARQ) messages on the dynamically-allocated PUCCH resources.

43. The method of claim 37, wherein when a minimum aggregation level, for a particular one or more of the plurality of UEs, is set at 2, 4, or 8, the at least one CCE carrying the downlink shared channel allocation is 2, 4, or 8 CCEs, respectively.

44. The method of claim 37, wherein when the HARQ region spans multiple resource blocks in the subsequent uplink subframe and a minimum aggregation level for the plurality of UEs is greater than one:
PUCCH resources corresponding to even-indexed CCEs that carry a downlink shared channel allocation are only allocated to a first type of UE; and PUCCH resources corresponding to odd-indexed CCEs that carry a downlink shared channel allocation are only allocated to a second type of UE.

\* \* \* \* \*